US010718136B2

(12) United States Patent
Williams

(10) Patent No.: US 10,718,136 B2
(45) Date of Patent: Jul. 21, 2020

(54) LOCK

(71) Applicant: Supra (UK) Limited, Worcestershire (GB)

(72) Inventor: Robert Williams, Hereford (GB)

(73) Assignee: Supra (UK) Limited, Worcestershire (GB)

( * ) Notice: Subject to any disclaimer, the term of this patent is extended or adjusted under 35 U.S.C. 154(b) by 0 days.

(21) Appl. No.: 16/030,978

(22) Filed: Jul. 10, 2018

(65) Prior Publication Data

US 2018/0320409 A1 Nov. 8, 2018

Related U.S. Application Data

(63) Continuation of application No. 15/454,354, filed on Mar. 9, 2017, now Pat. No. 10,047,542.

(30) Foreign Application Priority Data

May 3, 2016 (EP) .................................... 16168057

(51) Int. Cl.
*E05B 17/10* (2006.01)
*E05B 37/16* (2006.01)
(Continued)

(52) U.S. Cl.
CPC ............ *E05B 37/166* (2013.01); *E05B 17/10* (2013.01); *E05B 19/0005* (2013.01);
(Continued)

(58) Field of Classification Search
CPC ............... E05B 37/166; E05B 19/0005; E05B 37/0048; E05B 65/0075
(Continued)

(56) References Cited

U.S. PATENT DOCUMENTS 1,452,503 A 4/1923 Grubb
2,720,613 A * 10/1955 Lustig .................... H01H 13/70 200/16 A (Continued)

FOREIGN PATENT DOCUMENTS

CN 2192695 Y 3/1995
WO 2006/081487 A2 8/2006

(Continued)

OTHER PUBLICATIONS

European Search Report; Application No. 181799495-1005 dated Aug. 23, 2018.

(Continued)

*Primary Examiner* — Suzanne L Barrett
(74) *Attorney, Agent, or Firm* — Dinsmore & Shohl LLP

(57) ABSTRACT

A lock includes a housing having a plurality of apertures receiving buttons. A biasing member biases each button towards an un-pressed position. A plurality of spools includes circumferential grooves. Each circumferential groove has a notch that is angularly displaced relative to each of the other notches on that spool. A plurality of legs is in communication with one of the buttons and contacts one of the circumferential grooves. A locking plate includes apertures receiving the spools. An actuator is associated with the locking plate and a latch. Pressing and releasing the buttons causes translation of the spool rotationally orienting a notch to be adjacent to the locking plate. The locking plate only moves into an unlocked position, when driven by the actuator disengaging the latch and unlocking the lock if all of the notches which are adjacent to the locking plate are in a unlocked rotational orientation.

17 Claims, 25 Drawing Sheets

(51) Int. Cl.
*E05B 37/00* (2006.01)
*E05B 19/00* (2006.01)
*E05B 65/00* (2006.01)
*E05B 41/00* (2006.01)

(52) U.S. Cl.
CPC ...... *E05B 37/0048* (2013.01); *E05B 37/0058* (2013.01); *E05B 41/00* (2013.01); *E05B 65/0075* (2013.01)

(58) Field of Classification Search
USPC .......................................... 70/214, 321, 322
See application file for complete search history.

(56) References Cited

U.S. PATENT DOCUMENTS 3,357,216 A 12/1967 Cook
3,667,261 A 6/1972 McGourty
3,910,078 A 10/1975 Schulz
3,937,046 A 2/1976 Wang
4,027,508 A 6/1977 McGourty
4,799,371 A 1/1989 Duncan
4,838,052 A * 6/1989 Williams ............ E05B 19/0005 109/52
4,901,545 A * 2/1990 Bacon ..................... E05B 13/10 70/207
4,941,334 A 7/1990 Fish et al.
4,956,985 A 9/1990 Kim
5,845,523 A * 12/1998 Butterweck ............. E05B 41/00 70/278.1
6,000,254 A 12/1999 Raybary
6,026,665 A 2/2000 Raybary
7,071,434 B1 * 7/2006 McConnell ............ H01H 13/83 200/310
9,347,241 B1 5/2016 Peng
9,349,113 B2 * 5/2016 Bashkin ............... G06Q 10/087
10,047,542 B2 * 8/2018 Williams ............ E05B 19/0005
2001/0045112 A1 11/2001 Berton et al.
2003/0126896 A1 7/2003 Mori
2009/0109700 A1 * 4/2009 Yi ........................ G02B 6/0008 362/581
2011/0067461 A1 3/2011 Hacker
2011/0132049 A1 6/2011 Meekma et al.
2011/0162420 A1 7/2011 Lee
2012/0131968 A1 5/2012 Yi et al.
2013/0219977 A1 8/2013 Hill
2013/0298620 A1 11/2013 Graham
2014/0311390 A1 10/2014 Blankenship
2015/0000355 A1 1/2015 Wong
2015/0176308 A1 6/2015 Talpe
2016/0178159 A1 * 6/2016 Clark .................. E05B 65/0075 362/23.14
2017/0234038 A1 * 8/2017 Sanford .................. E05B 17/10 70/63
2018/0066453 A1 * 3/2018 Dobbins ............. E05B 47/0603
2018/0075682 A1 * 3/2018 Brockman .......... E05B 19/0005
2018/0163456 A1 * 6/2018 Hyde ................... A47B 81/005
2018/0186531 A1 * 7/2018 McBride ............ G07C 9/00722
2018/0274281 A1 * 9/2018 Bernkrant ................. E05G 1/04

FOREIGN PATENT DOCUMENTS

WO 2006/081487 A3 10/2006
WO WO-2008060657 A1 * 5/2008 ........... H01H 23/025
WO 2017139450 A1 8/2017

OTHER PUBLICATIONS

EPO Search Report for Appln. No. EP17163429, dated Jun. 16, 2017.

* cited by examiner

LOCK

CROSS-REFERENCE TO RELATED APPLICATIONS

This application is a continuation of U.S. application Ser. No. 15/454,354 filed Mar. 9, 2017 which claims priority to application Ser. No. 16/168,057.4 filed on May 3, 2016 in the European Patent Office, which is incorporated herein by reference in its entirety.

FIELD OF THE INVENTION

The present invention relates to a lock, typically but not exclusively for use in a lockable enclosure.

BACKGROUND OF THE INVENTION

A typical lock comprises a locking member, such as a lock bolt or latch, which is received within a keep when the lock is activated. When the lock is deactivated the locking member can be withdrawn from the keep. A lock mechanism is typically used to selectively restrict or control movement of a lock and/or control the locking member.

Lockable enclosures are used in many indoor or outdoor environments, both commercial and residential, to restrict access to various items by providing the enclosure with a lockable door, lid, drawer or other barrier. An example of such an enclosure is a key safe which is configured to securely house one or more keys and is affixed external to an entry door or building. The key safe comprises a locking mechanism, such as a pushbutton or combination dial locking mechanism, such that authorized users may enter the required unlocking combination or sequence and gain access to the one or more keys housed in the key safe. Additionally or alternatively, the lockable enclosure may house one or more credit and/or debit cards and/or money.

It is increasingly common for such key safes (or other locking enclosures) to comprise a mechanical pushbutton locking mechanism. Mechanical pushbutton locking mechanisms do not require an electrical power source to maintain accessibility to or function of the locking mechanism, thus there is no security risk posed by power outages or battery depletion.

Typically, a mechanical pushbutton lock comprises a series of buttons, each button configured to be disposed in either a depressed or selected position or an un-pressed or unselected position. When only the correct buttons have been pressed (irrelevant of the order in which the buttons are selected) the locking mechanism is configured to move a locking member from a locked position to an unlocked position. In practice, the security provided by these mechanisms may be inadequate, as the number of potential code combinations is limited because the codes are not sequence dependent. As such, the codes can be broken relatively quickly and easily by an unauthorized user simply by exhausting all of the possible code combinations.

A known solution to this problem is to use a mechanical pushbutton lock comprising a large number of buttons, thereby increasing the number of potential code combinations. This increases the security of the lock as it makes it more difficult for an unauthorized person to determine the correct code. However, in order to accommodate the additional buttons, the lock can be cumbersomely large. Also, if the code is too long it is easy for an authorized person to forget it, preventing them from opening the enclosure.

An alternative known solution is to use a mechanical pushbutton lock, wherein each button can be pressed multiple times (e.g. two or more times), sometimes known as a multi-press mechanical pushbutton lock. This increases the number of potential code combinations without increasing the number of buttons required on the locking mechanism. An example of a multi-press mechanical pushbutton lock is disclosed in US 2011/0132049.

In certain circumstances, it may be possible to break (also known as pick) a mechanical pushbutton lock, both the standard and multi-press version, without systematically trying each possible code combination. For example, and in broad terms, a skilled lock-breaker can turn the lever or other actuator to open the enclosure and then press the buttons until he hears and/or feels the locking mechanism click into the unlocked position.

SUMMARY OF THE INVENTION

In one aspect there is disclosed a lockable enclosure that includes a body having an internal cavity sized to contain one or more articles. An opening is provided through the body to permit access to the articles. A door is pivotably connected to the body. The door includes a plurality of apertures each aperture receiving a button therethrough. The door when in a closed position covers the opening in the body. A lock includes a latch, wherein the latch must be disengaged to move the door to an open position thereby gaining access to the article(s) and wherein the latch is disengaged by pressing one or more of the buttons a predetermined number of times. At least one light source is provided. At least one power source is in communication with the at least one light source. The at least one power source is disposed internally to the lockable enclosure. At least one light pipe is in communication with the at least one light source. The at least one light pipe is arranged to transmit light from the at least one light source to each of the buttons.

BRIEF DESCRIPTION OF THE DRAWINGS

Embodiments of the invention will now be described, by way of example only, with reference to the accompanying drawings, in which.

DETAILED DESCRIPTION OF THE PREFERRED EMBODIMENTS

Figure 1A:
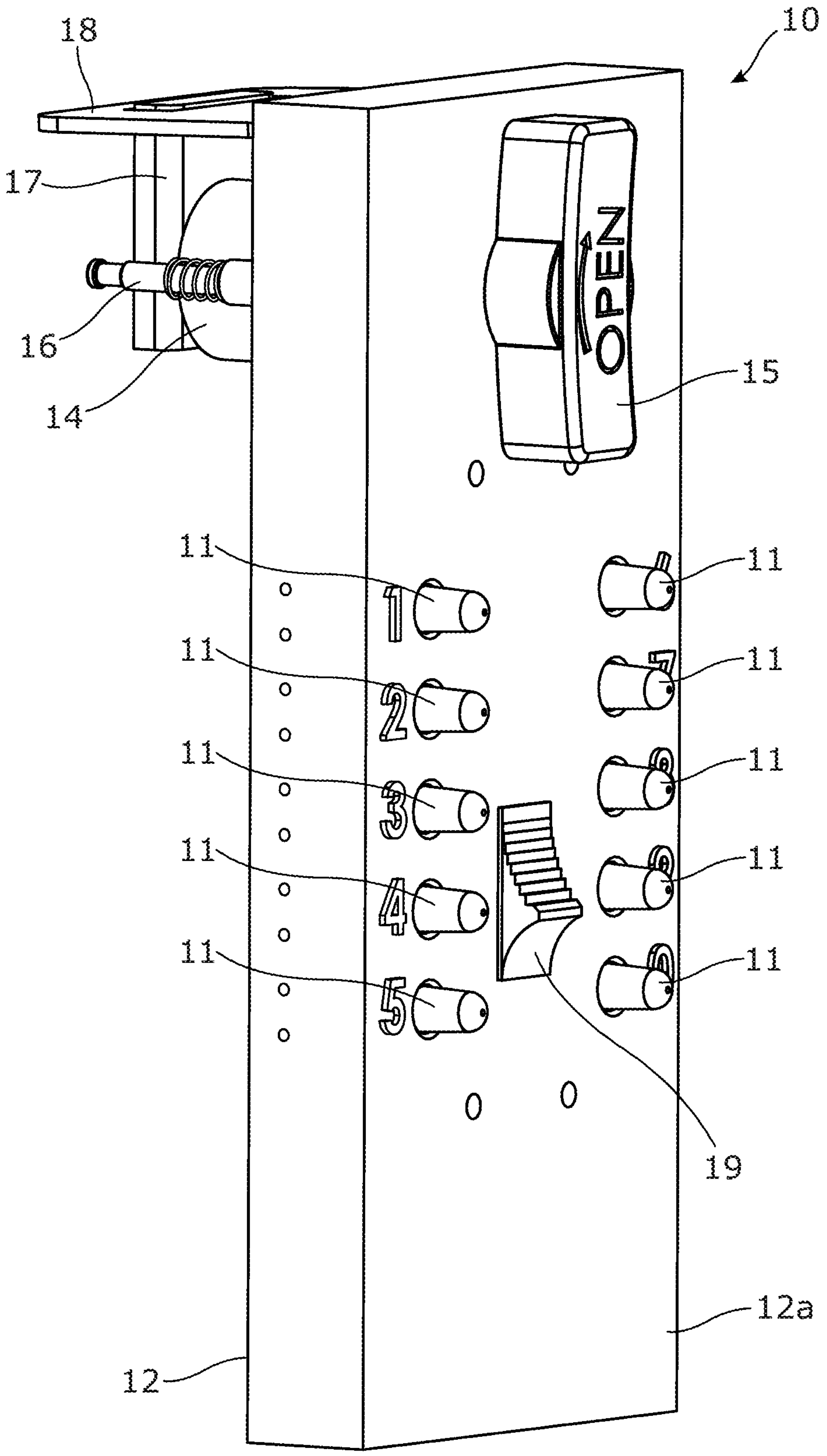
FIG. 1*a* shows a front perspective view of a lock according to a first embodiment of the invention.

In a first aspect of the present invention, there is provided a lock comprising:

- a housing having a front section comprising a plurality of apertures therethrough;
- a plurality of buttons disposed through the apertures in the front section of the housing, each button comprising a shank and a leg spaced from the shank and having an axis along which each of the buttons may be axially pressed between an un-pressed position and a pressed position;
- a biasing member associated with each of the plurality of buttons, configured so as to bias the buttons towards the un-pressed position;
- at least one rod mounted in the housing, each rod extending generally perpendicular to the shanks of the buttons;
- a plurality of ratchet sleeves disposed on each rod, each of the ratchet sleeves comprising a tubular portion and at least two teeth;
- a plurality of locking wheels, each locking wheel comprising a radial notch, wherein each locking wheel is configured to sit on the tubular portion of one of the plurality of ratchet sleeves, wherein the tubular portion and the locking wheel each comprise a plurality of interengaging elements such that, in use, the locking wheel does not rotate with respect to the ratchet sleeve;
- a locking plate disposed within the housing, the locking plate comprising a plurality of projections; and
- an actuator associated with the locking plate and a latch, wherein the actuator is configured to move the locking plate;
- wherein pressing one of the buttons causes the leg of the button to engage one of the teeth of a ratchet sleeve, thereby rotating the ratchet sleeve about the rod until the leg is operable to engage the adjacent tooth, after the button has been released;
- wherein, if one or more of the plurality of buttons are pressed a predetermined number of times the radial notch in each locking wheel is aligned with the corresponding projection in the locking plate, such that when the actuator is actuated in a first direction the locking plate is moved from a first position to a second position and the latch is disengaged, thereby unlocking the lock.

Thus, the present invention provides a mechanical push-button lock, wherein each of the buttons can be pressed two or more times, thereby increasing the number of potential code combinations. The code is defined as the predetermined combination of one of more of the buttons that is configured to unlock the lock. Each of the buttons may correspond to a number, or a letter, or other symbol.

Optionally, at least one of the buttons may correspond to two or more letters. Each press of the at least one button may corresponds to a different letter. For example, if each button may be pressed up to four times then each of the buttons may correspond to up to four letters. Each button may not necessarily correspond to the same number of letters.

In some embodiments, the front panel of the lock housing may comprise a plurality of markings indicating the least one number, and/or letter, and/or symbol to which each button corresponds.

Each biasing member will typically comprise a spring, typically a compression spring. This allows the buttons to return to the un-pressed position when the force of the user pressing the button has been removed.

In some embodiments, the code may comprise a combination of four button presses (e.g. four numbers). It is found that users often select a four-digit code as they can correspond to a date, or a year, and are generally easier to remember than longer codes, while providing adequate security in terms of the number of options of possible 4-digit codes. Alternatively, the code may comprise a combination of more than four button presses.

The sequence (or order) of the button presses is irrelevant, provided that only the correct buttons are pressed the correct number of times. The present invention increases the security of the lock compared to conventional single-press pushbutton locks, as not only is the present invention harder to break by exhausting all of the possible codes, but the codes may be easier to remember for authorized individuals, as repeated digits can be more memorable.

The number of teeth of the ratchet sleeves determines the number of different possible incremental rotational positions of the ratchet sleeve. Thus, the number of teeth of the ratchet sleeves determines the number of times that a single button can be pressed in the code. For example, if each of the ratchet sleeves has three teeth then the potential code combinations can comprise the same button (e.g. same number) repeated up to three times. The maximum length of the code is equal to the number of teeth of the ratchet sleeves (i.e. maximum number of presses of each button) multiplied by the number of buttons. For example, if the lock comprises ten buttons and each button can be pressed up to three times, the maximum possible length of the code would be 30 numbers long.

In contrast to known multi-press mechanical pushbutton locks, each of the ratchet sleeves and locking wheels may be disposed on common rods, wherein each rod extends generally perpendicular to the shanks of the buttons (i.e. perpendicular to the axis in which the buttons can be depressed). This may be advantageous as it may make the lock easier and cheaper to manufacture, as there is no need to provide a separate rod per button. There may be one, or two, or more, rods.

Where there are two or more rods, the rods may be adjacent and extend in parallel directions. This may allow the plurality of buttons to be disposed in two, or more, adjacent rows in the housing. Optionally, half of the buttons may be associated with ratchet sleeves disposed on one of the rods, and the other half associated with ratchet sleeves disposed on the other rods. In other embodiments, the buttons may be unevenly distributed between the two rods.

Optionally, the lock may comprise four or more buttons. In some embodiments, the lock may comprise ten buttons. Five of the ten buttons may be associated with ratchet sleeves disposed on one rod, and the other five buttons may be associated with ratchet sleeves disposed on an adjacent parallel rod.

In some embodiments, the leg of each button may extend substantially parallel to the shank and typically also the axis, the shank typically being coaxial with the axis. In other embodiments, the leg of the button may extend at an angle to the shank. The leg of the button may be a different length to the shaft of the button.

In some embodiments, the locking plate may comprise a plurality of holes, each hole sized to receive the shaft of one of the plurality of buttons therethrough. The holes may be arranged such that, when the locking plate is in the first position the shaft of each of the buttons are configured to pass through one of the holes.

The radial notches are sized to allow the corresponding projections of the locking plate to fit into the notches in one direction. The projections may be in the profile of the locking plate.

If the actuator is actuated to move the locking plate from the first position to the second position when the radial notches in the locking wheels are not aligned with the projections in the locking plate, the locking wheels block the locking plate so that it cannot reach the second position. In this blocked position the holes in the locking plate may be misaligned from the shafts of the buttons, such that the buttons cannot be pressed.

Optionally, in the blocked position the legs of the buttons cannot contact the ratchet sleeves. This arrangement may be advantageous as it prevents a user from actuating the actuator and pressing the buttons to attempt to feel and/or hear when the radial notches on the locking wheel engage the projections on the locking plate. Thus, the lock of the present invention is more secure thank known mechanical pushbutton locks, as it prevents, or reduces the risk of, the lock being picked.

In some embodiments, each locking wheel may comprise more than one radial notch. For example, each locking wheel may comprise two radial notches, wherein the radial notches may be opposite (i.e. disposed along a single diameter line through the wheel).

Optionally, the radial notches may only extend partially through the body of the locking wheel. The projections of the locking plate may pass completely into the notches in the locking wheels in the second position.

Optionally, the lock may further comprise a guide plate. The guide plate may comprise a plurality of holes through which the shafts of the buttons are arranged to be inserted. The guide plate may be disposed in-front of the locking plate, such that the shafts of the buttons pass through the guide plate before encountering the locking plate. Advantageously, the guide plate may be made of a rigid material, thereby increasing the strength and/or durability of the lock.

Optionally, the actuator may comprise a lever, or a button, or a handle, or a switch disposed on the front section of the housing that may be turned, pressed, rotated, pulled or translated by the user. For example, the actuator may comprise an elongate member that may be turned or pivoted by the user in a first direction to move the locking plate between the first position and the second position.

When the latch is engaged the actuator may be said to be in a closed position. When the actuator is actuated so as to move the locking plate from the first position to the second position, the actuator may be said to be in an open position. After the latch has been disengaged, the actuator may need to be moved back to the closed position to engage the latch.

Optionally, the lock may comprise a clutch mechanism coupled to the actuator. If an amount of force exceeding a predetermined limit is applied to the actuator then the clutch mechanism may cause the actuator to freewheel (e.g. disengage the actuator).

In some embodiments, the lock may further comprise a plurality of retention members, wherein each retention member may be configured to retain one of the ratchet sleeves in the position to which it has been rotated by the leg of a button. Optionally, each of the retention members may be configured to be disposed in the teeth of the ratchet sleeves.

In some embodiments, the plurality of retention members may be connected. For example, the plurality of retention members may comprise a plurality of projections extending from a single body. Optionally, the retention members may be resilient. The legs of the buttons may propel the ratchet sleeve past the retention member, but when rotated by each increment each ratchet sleeve may be held in place by the retention member.

Optionally, the lock may further comprise a plurality of torsion springs, wherein each torsion spring is coupled to one of the ratchet sleeves. Each ratchet sleeve may be biased towards a starting (i.e. non-rotated) position by the torsion spring.

In some embodiments, the retention members may be connected to a reset actuator such as a switch, or button, or tab, disposed on the housing. The reset actuator may be configured to move each of the retention members so that they no longer contact the ratchet sleeves. This will cause the ratchet sleeves to rotate back to their starting (i.e. un-rotated) position, either due to a bias in the ratchet sleeves or the biasing force of the torsion spring. This will allow a user to clear any button presses previously made. For example, a user can zero any buttons that may have been pressed by a previous user, or if he has mis-pressed a button, erase the code entered and start again.

The plurality of retention members may be connected to the locking plate. When the actuator moves the locking plate from the first position to the second position the retention members may be moved so that they release the ratchet sleeves. This will cause the ratchet sleeves to rotate back to their starting (i.e. un-rotated) position, either due to a bias in the ratchet sleeves or the biasing force of the torsion spring. Thus, the code entered by the user will be cleared or zeroed. Optionally, the retention members may only release the ratchet sleeves if the latch is disengaged when the actuator moves the locking plate from the first position to the second position.

The housing may comprise a back section, wherein the back section comprises a plurality of holes or apertures. Each of the holes or apertures may be positioned such that the locking wheels are accessible through the holes or apertures.

To change the code combination of the lock the user will be required to enter the correct code to unlock the lock. The user may then actuate (e.g. turn, rotate, press, pull or translate) the actuator in a second direction. The second direction may be opposite to the first direction (i.e. the direction used to disengage the latch). The actuator then enters the code setting position. The actuator may be configured such that it cannot be moved in the second direction unless the latch is disengaged. This prevents users who do not have the correct code combination from changing the code.

For example, the actuator may comprise an elongate member on the front of the housing that may be turned or pivoted in a first direction (e.g. clockwise) to disengage the latch. When the elongate member is turned or pivoted in a second direction (e.g. anticlockwise) the lock may enter the code setting function. The elongate member (or actuator) may not be turned or pivoted in the second direction unless the latch is or has been disengaged.

Optionally, the lock may further comprise a member such as a pin or plunger associated with the actuator. The member may extend out of the back section of the housing. The member may be arranged such that, if the member is in a first position then the actuator is prevented from entering the code setting position. Accordingly, in order to change the code combination, the user may be required to move the member into a second position, before moving the actuator into the code setting position.

When the lock enters the code setting function, the actuator may be configured to move the locking plate to separate the locking wheels from the interengaging elements on the tubular portions of the ratchet sleeves. For example, the actuator may be configured to lift the locking plate in a separating direction such as upwards in use, wherein the locking plate may be configured to lift each of the locking wheels such that each locking wheel disengages from the interengaging elements on the tubular portions of the ratchet sleeves. Optionally, in the code setting function, the locking plate may be moved in the opposite direction compared to when the actuator is actuated in the first direction.

To set the new code, the user may then manually rotate one or more of the locking wheels, such that the radial notches are disposed a certain number of incremental rotations away from the projections on the locking plate. For example, if the locking wheel corresponding to button number 1 is rotated so that the radial notches are three incremental rotations (i.e. three ratchet sleeve teeth positions) away from the projections on the locking plate, then the new code will contain the number 1 repeated three times (e.g. 1,1,1).

To make it easier for the user to set the new code, each of the locking wheels may comprise a series of markings, each marking corresponding to an incremental rotation, or number of presses of the corresponding button. The back section of the housing may comprise a series of indications proximate each locking wheel (e.g. a line, dot, arrow or other sign), wherein the marking on a locking wheel should be aligned with the indication to select the corresponding button to be pressed the number of times corresponding to the marking.

For example, each of the marking could be a number, either in Arabic or Roman numerals, the number corresponding to the number of presses required for the radial notch in the locking wheel to align with the projections in the locking plate when the marking is aligned with the indication on the housing. If the locking wheel is set to 0 (i.e. the marking corresponding to "0" is aligned with the indication of the housing, then the radial notch in the locking wheel is aligned with the projection in the locking wheel and that button must not be pressed to open the lock.

After the user has set the new code they may be required to enter the new code to disengage the latch.

Optionally, the back section of the housing may indicate which button each locking wheel corresponds to (or is associated with). For example, the at least one number, and/or letter, and/or symbol that the button corresponds to may be written, printed, engraved or otherwise marked on the back section of the housing proximate the corresponding locking wheel. In some embodiments, the indications may comprise a phosphorescent material, such that at least some of the indications may at least partially glow in the dark.

In some embodiments, the lock may comprise a cam in engagement with (e.g. disposed on) the actuator and a follower disposed on the locking plate. When the actuator is actuated in the first direction the cam may be configured to move the follower which moves the locking plate from the first position towards the second position. If the notch(es) in each lock wheel are aligned with the corresponding projection(s) in the locking plate then when the actuator is actuated in the first direction the cam may be configured to move the follower which moves the locking plate from the first position to the second position, thereby unlocking the lock.

In a second aspect of the present invention, there is provided a lock comprising:

- a housing having a front section comprising a plurality of apertures therethrough;
- a plurality of buttons disposed through the apertures in the front section of the housing, each button having an axis along which each of the buttons may be axially pressed between an un-pressed position and a pressed position;
- a biasing member associated with each of the plurality of buttons, configured to bias each button towards the un-pressed position;
- a plurality of spools, each spool comprising a plurality of circumferential grooves, each circumferential groove having a notch extending over a portion of the circumferential groove, wherein each notch on a given spool is angularly displaced relative to each of the other notches on that spool, the circumferential grooves being parallel and separated spaced apart at a groove spacing from each other;

a plurality of legs, each leg in communication with one of the buttons, wherein each leg is arranged to contact one of the circumferential grooves of one of the spools;

a locking plate disposed within the housing, the locking plate having a plurality of apertures, each aperture arranged to receive one of the spools therethrough;

an actuator associated with the locking plate and a latch, wherein the actuator is configured to move the locking plate;

wherein pressing one of the buttons causes the leg in communication with the button to translate the corresponding spool by one groove spacing, with releasing the button causing the leg to engage an adjacent groove; and

- wherein the translation of each spool causes a differently rotationally oriented notch to be adjacent to the locking plate, with the locking plate only being able to move into an unlocked position, when driven by the actuator, thereby disengaging the latch and unlocking the lock, if all of the notches which are adjacent to the locking plate are in a unlocked rotational orientation.

As the notches on a given spool are angularly displaced relative to each other, the notch on only one of the grooves is correctly positioned to be aligned with the aperture of the locking plate when that groove is positioned adjacent to the aperture of the locking plate. Therefore, each button must be pressed the correct number of times to translate the correct groove into position with the locking plate, or else the latch cannot be disengaged. Typically, the unlocked rotational orientation will comprise the notch being adjacent to a leading edge of the aperture, the leading edge being that edge which would make contact with the spool when the locking plate is driven into the unlocked position by the actuator.

Thus, the present invention provides a mechanical push-button lock, wherein each of the buttons can be pressed two or more times, thereby increasing the number of potential code combinations. The code is defined as the predetermined combination of one of more of the buttons that is configured to unlock the lock. Each of the buttons may correspond to a number, or a letter, or other symbol.

Optionally, at least one of the buttons may correspond to two or more letters. Each press of the at least one button may corresponds to a different letter. For example, if each button may be pressed up to four times then each of the buttons may correspond to up to four letters. Each button may not necessarily correspond to the same number of letters.

In some embodiments, the front panel of the lock housing may comprise a plurality of markings indicating the least one number, and/or letter, and/or symbol to which each button corresponds.

Each biasing member will typically comprise a spring, typically a compression spring. This allows the buttons to return to the un-pressed position when the force of the user pressing the button has been removed. There may be a single biasing member for all of the buttons, a common biasing member for a subset of the buttons, or a separate biasing member for each button.

In some embodiments, the code may comprise a combination of four button presses (e.g. four numbers). It is found that users often select a four-digit code as they can correspond to a date, or a year, and are generally easier to remember than longer codes, while providing adequate security in terms of the number of options of possible 4-digit codes. Alternatively, the code may comprise a combination of more than four button presses.

As in the first aspect of the invention, the sequence (or order) of the button presses is irrelevant, provided that only the correct buttons are pressed the correct number of times.

The number of circumferential grooves on each spool determines the number of different possible incremental translational positions of each spool. Thus, the number of circumferential grooves determines the number of times that a single button can be pressed in the code. For example, if each of the spools has four grooves then the potential code combinations can comprise the same button (e.g. same number) repeated up to three times. This is because the first groove may correspond to no presses of the button, the second groove to one press, the third groove to two presses, and the fourth groove to three presses of the button.

If each spool has the same number of grooves, then the maximum length of the code would be equal to the number of grooves of each spool (i.e. maximum number of presses of each button) multiplied by the total number of buttons. For example, if the lock comprises ten buttons and each button can be pressed up to four times, the maximum possible length of the code would be 40 numbers long.

In practice, the number of grooves on each spool will be limited by the diameter of each spool. This is because each groove must comprise a notch extending across at least a portion of the groove, wherein each notch on a given spool is angularly displaced relative to the other notches. Thus, as the notches are of a finite size, there are a finite number of angularly displaced notches that may be contained on a spool.

The angular position of the notches on a given spool may partially overlap. This may increase the number of grooves which may be present on each spool.

The plurality of legs may be integral to the plurality of buttons. Alternatively, each leg may be removably coupled to one of the buttons. For example, each leg may be attached to an annular member through which a shaft of one of the buttons may be inserted.

In one embodiment, each annular member may comprise a pivot about which the annular member and the leg can pivot relative to the shaft of the button. Typically, the pivot could comprise a ridge on the button engaging a notch in the annular member. The pivoting motion allows the leg to act as a pawl: it may be able to rigidly push the spool when translation of the spool is required typically when the button is pressed, but will pivot away from the spool as the button retracts after being pressed, such that it does not then translate the button in the opposing direction.

In some embodiments, the locking plate may comprise a plurality of holes, each hole sized to receive the shaft of one of the plurality of buttons therethrough. The holes may be arranged such that, when the locking plate is in the first position the shaft of each of the buttons are configured to pass through one of the holes.

If the actuator is actuated when the groove of one or more of the spools which is adjacent to one of the apertures in the locking plate has a notch which is not aligned with the leading edge of the aperture, then the one or more spools block the locking plate so that it cannot reach the second position.

In this blocked position the holes in the locking plate may be misaligned from the shafts of the buttons, such that the buttons cannot be pressed.

Optionally, in the blocked position the plurality of legs cannot contact the spools. This arrangement may be advantageous as it prevents a user from actuating the actuator and pressing the buttons to attempt to feel and/or hear when a notch on the corresponding spool engages the locking plate. Thus, the lock of the present invention is more secure thank known mechanical pushbutton locks, as it prevents, or reduces the risk of, the lock being picked.

Optionally, each notch may only extend partially through the body of the spool.

Optionally, the lock may further comprise a plurality of spool biasing members, wherein each spool biasing member is coupled to one of the spools. Each spool may be biased towards a starting (i.e. non-translated) position by the spring.

The lock may further comprise a guide plate. The guide plate may comprise a plurality of holes through which the shafts of the buttons are arranged to be inserted. The guide plate may be disposed in front of the locking plate, such that the buttons (e.g. the shafts of the buttons) pass through the guide plate before encountering the locking plate. Advantageously, the guide plate may be made of a rigid material, thereby increasing the strength and/or durability of the lock.

The guide plate may comprise a guiding means for each spool. Typically, each guiding means will comprise a passageway in the guide plate in which the spool is received. The passageway may surround the spool circumferentially apart from over an access area having a circumferential extent; typically, each leg will engage each spool through the access area. We have appreciated that this gives secure guidance to the spools.

Furthermore, the lock may comprise a sleeve for each spool, with each sleeve being positioned adjacent to the bore in which the spool is received, each spool and sleeve being positioned such that, as the spool is translated the spool moves into the sleeve. Each sleeve and each spool may be rotationally keyed relative to each other, such that they cannot rotate relative to each other. Typically, each spool may have a ridge and each sleeve may have a corresponding notch.

Each sleeve may be rotatable relative to the guide plate. As such, this allows rotation of the spool to set the combination of the lock, as it will change the angular position of the notches of that spool. Typically, the sleeve will be held in the housing, and will be so held such that they cannot be accessed when the lock is locked.

Each sleeve may comprise a blind bore in which the spool is receivable. Typically, each spool biasing member may be provided within the blind bore, with the biasing member typically acting between a closed end of the blind bore and the spool.

Optionally, the actuator may comprise a lever, or a button, or a handle, or a switch disposed on the front section of the housing that may be turned, pressed, rotated, pulled or translated by the user. For example, the actuator may comprise an elongate member that may be turned or pivoted by the user in a first direction to move the locking plate between the first position and the second position.

When the latch is engaged the actuator may be said to be in a closed position. When the actuator is actuated so as to move the locking plate from the first position to the second position, the actuator may be said to be in an open position. After the latch has been disengaged, the actuator may need to be moved back to the closed position to engage the latch.

Optionally, the lock may comprise a clutch mechanism coupled to the actuator. If an amount of force exceeding a predetermined limit is applied to the actuator then the clutch mechanism may cause the actuator to freewheel (e.g. disengage the actuator).

In some embodiments, the lock may further comprise a plurality of retention members, wherein each retention member is configured to retain one of the spools in the position to which it has been translated by one of the legs.

Optionally, each of the retention members may be disposed in one or more grooves of each spool.

In some embodiments, the plurality of retention members may be connected. For example, the plurality of retention members may comprise a plurality of projections extending from a single body. Optionally, the retention members may be resilient. The legs in communication with the buttons may propel the spools past the corresponding retention member, but when translated by each increment each spool may be held in place by the retention member.

For example, a spool may comprise four grooves. The retention member may be initially disposed in the first groove and the leg may be initially engaged with the second groove. When the corresponding button is pressed the leg may exert a sufficient force on the spool to translate the spool past the maximum pivot point of the retention member. The retention member may then snap back to engage the second groove on the spool. At this point the leg may be pivoted or pushed away from the spool to engage the third groove. Thus, the spool has been translated by one groove.

The lock may comprise a plurality of rods mounted within the housing, each rod having a spool mounted thereon, wherein each rod is disposed adjacent to, and extends generally parallel to, one of the buttons.

In some embodiments, each spool biasing member may be substantially surrounded by one of the spools. For example, each spool biasing member may be substantially received within an interior of the spool. Optionally, only a head of each rod may protrude from the spool. This may significantly reduce the width of the lock mechanism.

Optionally each spool biasing member may comprise a first portion and a second portion (e.g. a first spring and a second spring). The first portion may be separated from the second portion. The first portion of each spool biasing member may be substantially received within an interior of one of the spools. Each spool and each first and second portion of the spool biasing members may be mounted on one of the plurality of rods. A sleeve may separate the first portion from the second portion of each spool biasing member. The sleeve may be configured to provide a differential sliding motion.

The differential sleeve may resist any force exerted by the locking plate whilst providing adequate length for the spool biasing member.

In some embodiments, the retention members may be connected to a reset actuator such as a switch, or button or tab. The reset actuator may be disposed on the housing. The reset actuator may be configured to move each of the retention members so that they no longer contact the spools. This will cause the spools to translate back to their starting (i.e. un-translated) position, either due to a bias in the spools or the biasing force of the torsion spring. This will allow a user to clear any button presses previously made. For example, a user can zero any buttons that may have been pressed by a previous user, or if he has mis-pressed a button, erase the code entered and start again.

The plurality of retention members may be connected to the locking plate. Optionally, when the actuator moves the locking plate from the first position towards the second position the retention members may be moved so that they disengage the spools.

Optionally, the retention members may only release the spools if the latch is disengaged when the actuator moves the locking plate from the first position to the second position.

The biasing members (e.g. springs) configured to bias each button towards the un-pressed position may be configured to move the leg associated with a given button when the button is pressed. Just before the leg and button return to their un-pressed position the leg may contact a stop which swings (or tilts) a lower part of the leg away from the spool. This allows the reset actuator to release the spool without interference from the leg.

In some embodiments, the lock may comprise a first cam in engagement with the actuator (e.g. disposed on the actuator) and a first follower disposed on the locking plate. When the actuator is actuated the first cam may be configured to move the first follower which moves the locking plate from the first position towards the second position. If the correct groove is aligned with the locking plate such that the notch in the groove aligns with the leading edge of the aperture, then when the actuator is actuated the first cam may be configured to move the first follower which moves the locking plate from the first position to the second position, thereby unlocking the lock.

The lock may also comprise a second cam in engagement with the actuator and a second follower in communication with the plurality of retention members. The second follower may be disposed on the central connecting member. When the actuator is actuated, the second cam may be configured to move the second follower to disengage the plurality of retention members from the spools. The second cam may be configured to move the second follower after the first follower has moved the locking plate.

The second cam may be configured to move the second follower only if the locking plate reaches the second position.

The housing may comprise a back section, wherein the back section comprises a plurality of holes or apertures. Each of the holes or apertures may be arranged such that the rods are accessible through the holes or apertures.

To change the code of the lock the user will be required to enter the correct code to unlock the lock to gain access to the back section of the lock housing. The user must then actuate (e.g. turn, rotate, press, pull or translate) the actuator to re-lock the lock (i.e. engage the latch).

To set the new code the user must rotate one or more of the plurality of rods to align the notch in the selected groove with the leading edge of the aperture of the locking plate. The position of the selected groove along the spool will then define the number of presses of the corresponding button needed to unlock the lock (i.e. the number of times the number or letter corresponding to that button appears in the code).

For example, if the user wishes the code combination to be 4444 they may rotate the rod corresponding to the number 4 to align (or orientate) the notch in the fifth groove (i.e. fifth groove along the spool) with the leading edge of the aperture of the locking plate. To avoid confusion with the end user the fifth groove may be marked "4" to help prevent confusion of the end user. Each of the other rods may be rotated to align the notch on the first groove with the leading edge of the aperture of the locking plate. Thus, when the button corresponding to the number four is pressed four times, and the other buttons are not pressed, the notch on the groove of each spool which is positioned adjacent to the aperture of the locking plate with be aligned with the leading edge of the aperture.

After the user has set the new code they may be required to enter the new code to disengage the latch.

Optionally, to engage the latch (or re-lock the lock) the actuator may be moved in a first direction. To disengage the latch the actuator may be move in a second direction, which is different to the first direction. The second direction may be opposite to the first direction (i.e. the reverse of the first direction).

The lock may be configured such that the user cannot gain access to the rods through the apertures or holes in the back section of the housing unless the latch is engaged (i.e. the lock is locked). For example, the lock may comprise a panel connected to the latch, wherein when the latch is engaged (i.e. locked) the panel blocks the apertures or holes in the back section of the housing. When the actuator withdraws or disengages the latch the panel may be moved such that it allows access to the plurality of rods.

The panel may comprise a plurality of holes through which the heads of the rods are accessible when the latch is engaged.

A head of each rod may protrude through the back section of the housing. The head may comprise a recess, protrusion or other feature suitable to engage a screw-driver or other elongate member which may be used to rotate the head. This may make it easier for the rods to be rotated when setting the code.

To make it easier for the user to set the new code, the back section of the housing may comprise a series of markings, each marking corresponding to the number of presses of the corresponding button needed to align a notch with the locking plate.

The head of each rod may comprise an indication (e.g. a line, dot, arrow or other sign), wherein the indication should be aligned with one of the markings on the back section of the housing to select the number of times the corresponding button should be pressed in order to unlock the lock.

For example, the back section of the housing may comprise a series of numbers (in Arabic or Roman numerals) angularly displaced around the apertures or holes through which the plurality of rods are accessible. The head of each rod may comprise an arrow (or line). To set the code the user may be required to rotate each rod to align the arrow (or line) with the chosen marking on the back section of the housing.

The indication on the head of each rod (e.g. the arrow, or line) may be at least partially formed by the recess, protrusion or other feature in the head of each rod.

The series of markings and the indications may be one or more of printed, engraved, etched, embossed, adhered, or otherwise applied onto the back section of the housing or the head of each rod.

Optionally, the back section of the housing may indicate which button each rod corresponds to (or is associated with). For example, the at least one number, and/or letter, and/or symbol that the button corresponds to may be written, printed, engraved or otherwise marked on the back section of the housing proximate the corresponding locking wheel.

Optionally, the markings and/or indications on the back section of the housing and/or the rods may comprise a phosphorescent material, such that at least some of the markings and/or indications may at least partially glow in the dark.

In a third aspect of the present invention, there is provided a lockable enclosure designed to contain one or more articles, the lockable enclosure comprising the lock of any embodiment of the first or second aspect of the present invention, wherein the latch of the lock must be disengaged to gain access to the articles.

The lockable enclosure may comprise a body having an internal cavity sized to contain one or more articles, an opening through the body to permit access to the articles, and a door pivotably connected to the body, wherein when the door is in a closed position it covers the opening in the body. If the latch of the lock is engaged the door may be locked in the closed position. If the latch of the lock is disengaged then the door may be opened to allow access to the one or more articles.

The lock of the present invention may be disposed in the door of the lockable enclosure. For example, the front section of the lock housing may be integral to the door. In another example, the lock may be inserted in an aperture in the door, such that the front section of the lock housing is accessible by an external user when the door is in a closed position, but the back section of the housing is disposed within the cavity of the lockable enclosure.

Optionally, the door of the lockable enclosure may comprise a plurality of apertures, each aperture configured to receive a button of the lockable enclosure therethrough. The front section of the housing may be connected to the door such that the buttons extend through the apertures in the door.

The door may comprise a plurality of markings indicating the least one number, and/or letter, and/or symbol to which each button corresponds. Optionally, the markings may be engraved, embossed, printed, adhered or otherwise applied to the door of the lockable enclosure. In some embodiments, the markings may comprise a phosphorescent material, such that at least some of the markings may at least partially glow in the dark.

Optionally, the lock actuator may be actuated by a handle or door-knob configured to open the door of the lockable enclosure. For example, when the handle is pressed downwards the actuator may move the locking plate from the first position towards to second position.

Optionally, the lockable enclosure may be a key safe. The lock may be mounted in the door such that the front section of the housing, at least partially, forms a front panel of the door.

In other embodiments, the lockable enclosure may be a safe, or a lockable cabinet or lock box.

The door may be pivotably connected to the body of the lockable enclosure (e.g. key safe) at the base of the door.

Optionally, a rear panel of the body of the lockable enclosure may comprise mounting apertures to enable the body of the panel to be screwed into a wall. Alternatively, the lockable enclosure may be shackled or fastened around an object, for example a door handle. The shackle may only be undone or disconnected from inside the lockable enclosure, i.e. when the latch has been disengaged.

The lockable enclosure may comprise one or more hooks. For example, the lockable enclosure may be a key safe, a rear panel of the body of the key safe may comprise one or more hooks for hanging keys thereon. Optionally, the rear panel of the key safe may comprise one hook for hanging at least one Chubb style key and one hook for hanging at least one Yale style key.

Optionally, the door of the lockable enclosure may comprise at least one elongate member extending, at least partially, into the internal cavity of the body of the lockable enclosure. For example, when the door is in a closed position each elongate member may extend into the internal cavity beyond a point where the door abuts the body of the lockable enclosure.

In some embodiments, each elongate member may be arranged to be received in a corresponding aperture in the body of the lockable enclosure when the door is in a closed position. In some embodiments, the at least one elongate member may be disposed proximate to, or in contact with, the rear panel of the body of the lockable enclosure when the door is in a closed position.

Optionally, the body of the lockable enclosure may comprise at least one elongate member extending, at least partially, into the internal cavity of the body of the lockable enclosure. The at least one elongate member may be arranged to contact an elongate member extending from the door of the lockable enclosure, when the door is in a closed position. Optionally, the at least one elongate member may protrude from the internal cavity of the lockable enclosure. For example, when the door is in a closed position, at least one elongate member may extend beyond a point where the body abuts the door of the lockable enclosure.

The at least one elongate member extending from the door and/or body of the lockable enclosure may be a dowel pin.

The at least one elongate member extending from the door and/or body of the lockable enclosure may be formed of a hard material relative to the door and/or body of the lockable enclosure. Optionally, the at least one elongate member may comprise, or consist essentially of, any material which is harder than high speed steel (HSS). This may make it significantly more difficult to forcibly gain entry to the lockable enclosure by sawing through the join between the door and the body of the lockable enclosure.

In some embodiments, the body and/or door of the lockable enclosure may comprise zinc or a zinc alloy. The at least one elongate member may comprise, at least partially, a hardened metal. Optionally, the at least one elongate member may be nitrated. For example, one or more of the elongate members may consist essentially of silicon nitrated ($Si_3Ni_4$) steel. It may be advantageous to use elongate members consisting essentially of hardened metal (e.g. nitrated metal) as this does not result in brittle elongate members.

Optionally, only the outer layer of the at least one elongate member may comprise, or consist essentially of, a hardened metal. The inner core of the elongate member(s) may be softer than the outer layer. In other words, the at least one elongate member may be case hardened (e.g. case hardened dowel pins). The outer layer of the at least one elongate member may be hardened by adding one or more of carbon, nitrogen, chrome, boron or other elements to the core metal surface region through diffusion, implantation or other reactions. Case hardening processes are commonly referred to as carburizing, nitriding, ferritic nitriding, carbon-nitriding, etc.

Optionally, the lockable enclosure may comprise a removable interior cover or flap designed to, at least partially, cover the back section of the lock housing. The user may have to remove the removable cover or flap when changing the code combination. In some embodiments, the removable interior cover or flap may only cover the apertures in the back section of the lock housing through which the locking wheels are accessible.

In some embodiments, the lockable enclosure may further comprise a removable exterior case or cover configured to cover at least the front section of the lock housing. The removable exterior case or cover may protect the lock from the environment (e.g. from animals, water damage, weathering or rusting) if placed outside.

The exterior cover may be pivotably connected to the lockable enclosure. Optionally, the exterior cover may comprise a mounting apparatus disposed on an outer surface of the exterior cover. The mounting apparatus may be operable to attach a house number plate and/or a decorative object to the exterior cover of the lockable enclosure. This may be advantageous to disguise the lockable enclosure (e.g. from unauthorized individuals, such as potential criminals).

The lockable enclosure may comprise a light source for each button. Optionally, the lockable enclosure may comprise at least one light source internal to the lockable enclosure which is arranged to transmit light to each button. For example, each button may comprise transparent material which may act as a light guide, and/or each button may be provided with a light guide (or light pipe) which transmits light from the light source to the button. Alternatively, the at least one light source may be disposed inside the door and/or body of the lockable enclosure which may comprise at least one light pipe which is configured to transmit light from the light source to the exterior of the lockable enclosure.

The lockable enclosure may comprise at least one power source in communication with the at least one light source. For example, at least one battery may be mounted inside the door of the lockable enclosure. The at least one battery may be removable, such that it can be replaced when required and/or recharged. Optionally, the lockable enclosure may comprise at least one battery holder.

Optionally, the at least one light source may be arranged to at least partially illuminate the internal cavity of the lockable enclosure when the door is in the open position.

Alternatively, the lockable enclosure may comprise an additional light source located within the internal cavity of the lockable enclosure, wherein the additional light source is configured to, at least partially, illuminate the internal cavity of the lockable enclosure when the door is in an open position. This may make it easier for a user to locate the one or more articles stored inside the lockable enclosure, or locate the one or more hooks when returning one or more articles (e.g. keys) to the enclosure.

The at least one additional light source may be connected to the same power source as the at least one light source, or a different power source.

Optionally, the lockable enclosure may comprise at least one sensor operable to detect when the door is in an open and/or closed position. For example, the at least one sensor may be a position sensor.

At least one of the sensor(s) may be in communication with the at least one light source and the door of the lockable enclosure. When the door is in an open position the at least one sensor may transmit a signal to turn off the at least one light source. The signal may only be transmitted if the door is in an open position for a predetermined period of time. This may prevent the at least one light sources running out of power if the door is left in an open position.

At least one of the sensor(s) may be in communication with the additional light source and the door of the lockable enclosure. When the door is in an open position the at least one sensor may transmit a signal to turn on the additional light source.

The at least one light source and/or additional light source may comprise one or more LEDs.

The additional light source may be in communication with a timer, such that the additional light source can only remain turned on for a predetermined period of time. This may maximize the lifetime of the power source for the additional light source.

According to a fourth aspect of the present invention, there is provided a lockable enclosure comprising:

a body having an internal cavity sized to contain one or more articles;

an opening through the body to permit access to the articles;

a door pivotably connected to the body, the door comprising a plurality of apertures each aperture receiving a button therethrough, wherein when the door is in a closed position it covers the opening in the body;

a lock comprising a latch, wherein the latch must be disengaged to move the door to an open position thereby gaining access to the article(s) and wherein the latch is disengaged by pressing one or more of the buttons a predetermined number of times;

at least one light source mounted to the door of the lockable enclosure;

at least one power source in communication with the at least one light source, the at least one power source disposed internally to the lockable enclosure; and at least one light pipe in communication with the at least one light source, wherein the at least one light pipe is arranged to transmit light from the at least one light source to each of the buttons.

The lock mechanism may be any known mechanical or electronic lock mechanism.

Optionally, the lockable enclosure may comprise a separate light source for each button.

Optionally, each button may comprise transparent material which may act as a light guide. For example, an outer surface of the button may consist essentially of a transparent material which is arranged to be illuminated by the light transmitted by the at least one light pipe.

For example, the at least one power source may comprise at least one battery. The at least one battery may be mounted inside the door of the lockable enclosure. The at least one battery may be removable, such that it can be replaced when required and/or recharged. Optionally, the lockable enclosure may comprise at least one battery holder.

Optionally, the at least one light source may be arranged to at least partially illuminate the internal cavity of the lockable enclosure when the door is in the open position.

Alternatively, the lockable enclosure may comprise an additional light source located within the internal cavity of the lockable enclosure, wherein the additional light source is configured to, at least partially, illuminate the internal cavity of the lockable enclosure when the door is in an open position. This may make it easier for a user to locate the one or more articles stored inside the lockable enclosure, or locate the one or more hooks when returning one or more articles (e.g. keys) to the enclosure.

The at least one additional light source may be connected to the same power source as the at least one light source, or a different power source.

Optionally, the lockable enclosure may comprise at least one sensor operable to detect when the door is in an open and/or closed position. For example, the at least one sensor may be a position sensor.

At least one of the sensor(s) may be in communication with the at least one light source and the door of the lockable enclosure. When the door is in an open position the at least one sensor may transmit a signal to turn off the at least one light source. The signal may only be transmitted if the door is in an open position for a predetermined period of time. This may prevent the at least one light sources running out of power if the door is left in an open position.

At least one of the sensor(s) may be in communication with the additional light source and the door of the lockable enclosure. When the door is in an open position the at least one sensor may transmit a signal to turn on the additional light source.

The at least one light source and/or additional light source may comprise one or more LEDs.

The additional light source may be in communication with a timer, such that the additional light source can only remain turned on for a predetermined period of time. This may maximize the lifetime of the power source for the additional light source.

Any example or embodiment of the third aspect of the invention may apply equally to the fourth aspect of the invention.

Although the third and fourth aspects of the present invention are directed towards lockable enclosures, it will be appreciated that the lock of the first or second aspects of the invention could be used in a variety of different security applications or lockable devices. For example, the lock of the present invention may be used in key cabinets, door furniture, or as a retrofitable door lock, and so on. This list is not an exhaustive list of the applications of the present invention.

Figure 1B:
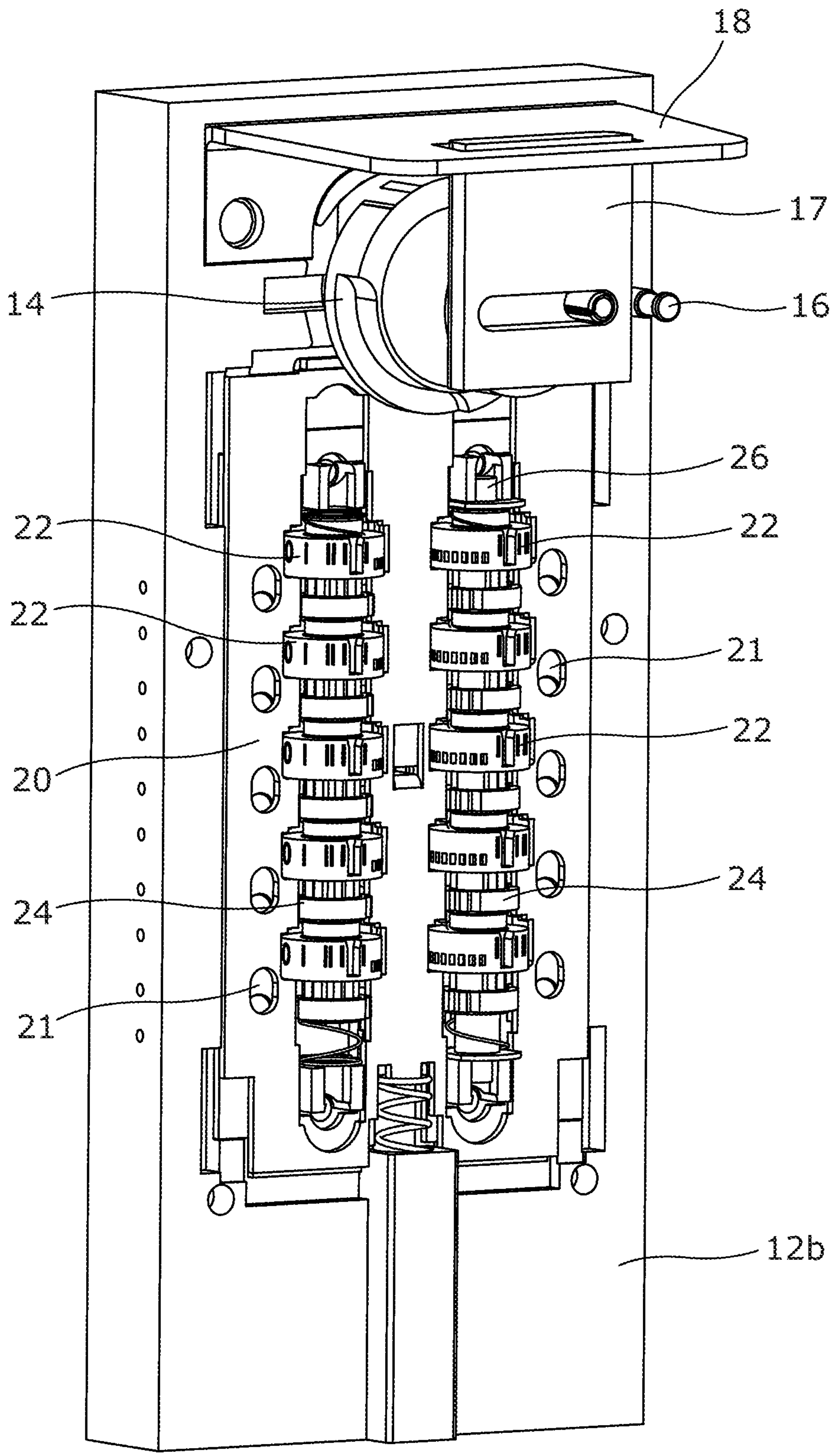
FIG. 1*b* shows a back perspective view of the lock of FIG. 1*a;*

FIGS. 1*a* and 1*b* show a lock 10 in accordance with a first embodiment of the invention comprising a housing 12 having a front section 12*a*. The front section 12*a* of the housing 12 comprises a plurality of apertures through which a plurality of buttons 11 is inserted.

The lock comprises an actuator 14 having an elongate member 15 disposed on the front section 12*a* of the housing. In this example, when the elongate member 15 is turned clockwise the actuator 14 disengages latch 17, thereby unlocking the lock 10. When latch 17 is disengaged it is retracted through an opening in a latch plate 18.

To disengage the latch 17 a user must press one or more of the buttons 11 a predetermined number of times and turn the elongate member 15 clockwise. Each of the buttons 11 can be pressed more than once.

Switch 19 disposed on the front section 12*a* of the housing 12 is a reset actuator configured to clear (or zero) any button presses previously made when a user slides switch 19 downwards.

A shaft of each of the buttons 11 is configured to be insertable through one of a plurality of holes 21 in a locking plate 20. The locking plate 20 is coupled to the actuator 14 such that the actuator can move the locking plate 20.

The lock 10 further comprises two rods 26 (only rod is shown in FIG. 1*b*) mounted in the housing 12. Each rod extends perpendicular to the shanks of the buttons 11 (i.e. perpendicular to the axis in which the buttons 11 can be depressed). In other embodiments, only one row of buttons 11 and one rod many be provided, or more than two rows of buttons 11 and more than two rods may be provided.

A plurality of ratchet sleeves 24 are disposed on each of the rods 26, wherein each ratchet sleeve 24 is associated with one of the buttons 11. Each of the ratchet sleeves 24 is flanged comprising a plurality of external ratchet teeth and a tubular portion disposed above the ratchet teeth. The tubular portions comprise a plurality of projections or splines. A locking wheel 22 is configured to sit on the tubular portion of each of the ratchet sleeves 24, wherein the plurality of projections or splines mesh with a plurality of complementary teeth on the inside of the locking wheels 22 (not shown) to prevent the locking wheels 22 from rotating relative to the ratchet sleeves 24 (except in the code changing function).

In other embodiments, the inside of the locking wheels 22 or the tubular portions may comprise a plurality of grooves.

The lock 10 further comprises a plunger 16 extending from the back section 12*b* of the housing.

To change the code combination of the lock (i.e. to determine the number of times one or more of the plurality of buttons 11 must be pressed to disengage the latch 17) a user must enter the current code to retract the latch 17. The user then pulls the plunger 16 away from the housing 12 and turns the elongate member 15 in an anti-clockwise direction. If the plunger 16 is not pulled away from the housing then the elongate member 15 cannot be turned in an anti-clockwise direction. In use, the plunger 16 is only accessible after having unlocked the lock 10 (see FIG. 7*a*). More detail regarding how to change the code is given in connection with FIGS. 4*a* and 4*b*.

Figure 2:
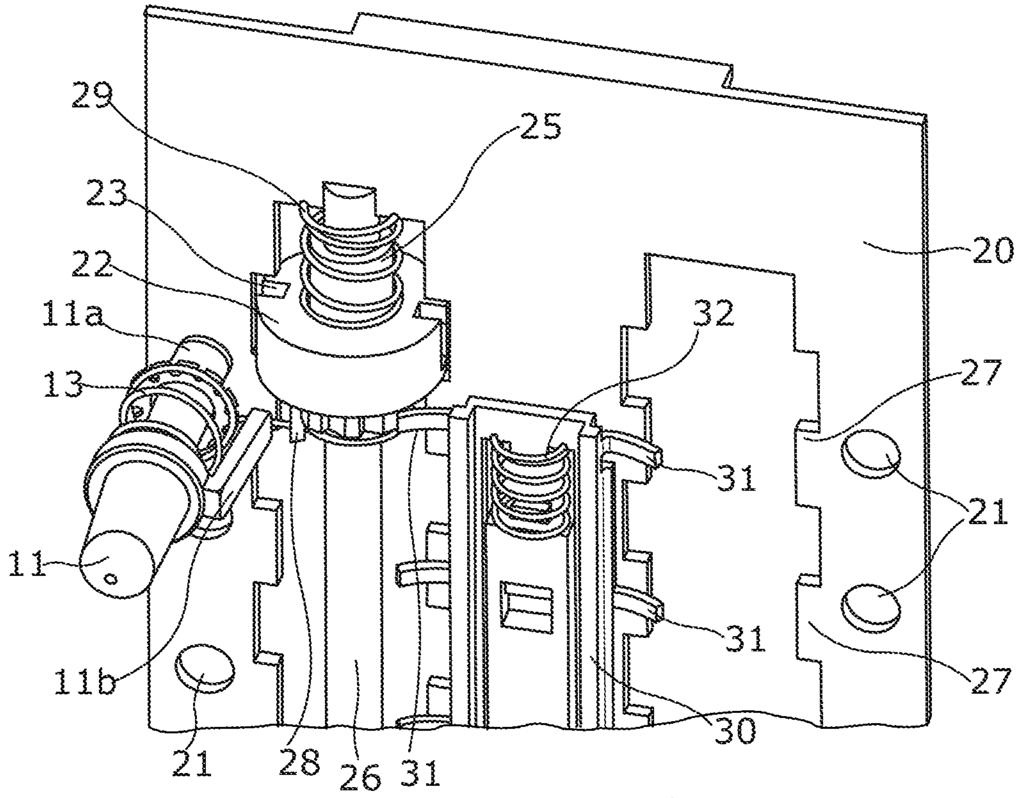
FIG. 2 shows a front perspective view of a section of the lock in FIG. 1*a;*

FIG. 2 shows a front perspective view of a section of the interior of lock 10. As shown, button 11 comprises a shaft 11*a* and a leg 11*b* extending from the button 11. In this example, the leg 11*b* extends at an angle of between 0 and 20 degrees to the shank 11*a*.

When the button 11 is pressed, the shank 11*a* is configured to be inserted through the corresponding hole 21 in the locking plate 20. The leg 11*b* engages on of the teeth 28 of the ratchet sleeve and causes the ratchet sleeve to rotate about the rod 26 by one incremental rotational position until the leg 11*b* is operable to engage the adjacent tooth 28. A biasing member 13 comprising a spring biases the button 11 towards the un-pressed position, therefore when the user removes the pressing force the button 11 returns to the un-pressed position. If the button is 11 pressed a second time, leg 11*b* engages the adjacent tooth 28 and rotates the ratchet sleeve by ad additional incremental rotational position.

When the ratchet sleeve 24 is rotated by leg 11*b* the locking wheel 22 also rotates by the same amount, as the locking wheel 22 is disposed at a fixed position on the tubular portion 25 of the ratchet sleeve (as described above). The locking wheel 22 comprises a pair of radial notches 23, wherein the notches 23 are opposite. The notches 23 only extend partially through the locking wheel 22, such that the bottom surface of the locking wheel 22 (i.e. the surface that contacts the teeth 28 of the ratchet sleeve) does not comprise a notch.

The notch 23 is configured such that, when it is aligned with the corresponding projection 27 of the locking plate 20, the projection 27 can fit downwards through the notch 23, but the projection 27 underneath the locking wheel 22 cannot fit upwards through the notch 23.

A plurality of retention members 31 are connected by a central connecting member 30. The central connecting member is coupled to the locking plate 20 by a tab, as shown. A spring may exert a biasing force on the connecting member 30, such that if the connecting member is displaced from the position shown in FIG. 2 (i.e. moved upwards or downwards), it returns to that position.

Each of the retention members 31 are configured to be disposed in the teeth 28 of one of the plurality of ratchet sleeves. When the retention member 31 is disposed in the teeth 28 of the retention member 31 prevents the ratchet sleeve from rotating (i.e. it retains the ratchet sleeve in the rotated position), e.g. by exerting a retaining force on the ratchet sleeve. A torsion spring 33 biases the ratchet sleeve towards its starting (i.e. un-rotated) position. Therefore, if the retention member 31 is moved such that it not disposed in the teeth of the ratchet sleeve, the ratchet sleeve is released and it rotates back to its starting (i.e. un-rotated) position. The retention members 31 and the connecting member 30 may be referred to as a centipede.

Figure 3:
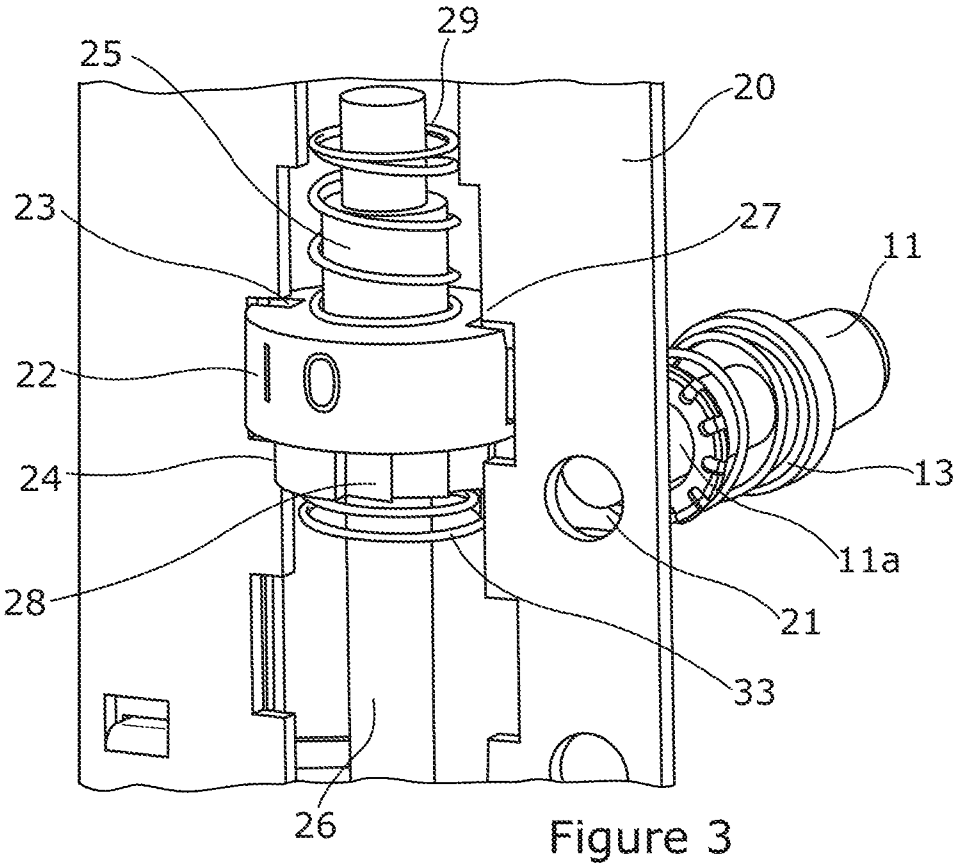
FIG. 3 shows a back perspective view of a section of the lock in FIG. 1*a;*

When the notches 23 in the locking wheel 22 are aligned with the projections 27, as shown in FIG. 2, the user may turn the elongate member 15 in the clockwise direction (see FIG. 1*a*) to actuate the actuator 14 which moves the locking plate downwards from the first position (shown in FIG. 2) to the second position (shown in FIG. 3). The latch 17 is then disengaged (e.g. retracted) and the lock is unlocked.

As shown in FIG. 3, when the locking plate 20 is moved downwards from the first position to the second position the shafts 11*a* of the buttons 11 are misaligned from the holes 21 in the locking plate. Thus the buttons 11 cannot be pressed as they are blocked by the locking plate 20. Also, even if the notches 23 are not aligned with the corresponding projections 27, when the elongate member 15 is turned in the clockwise direction the locking plate 20 is moved slightly downwards, such that the shafts 11*a* of the buttons 11 are still misaligned from the holes 21. However, the locking plate 20 does not reach the second position as it is blocked by the locking wheel 22 and so the latch is not disengaged (e.g. retracted).

Figure 4A:
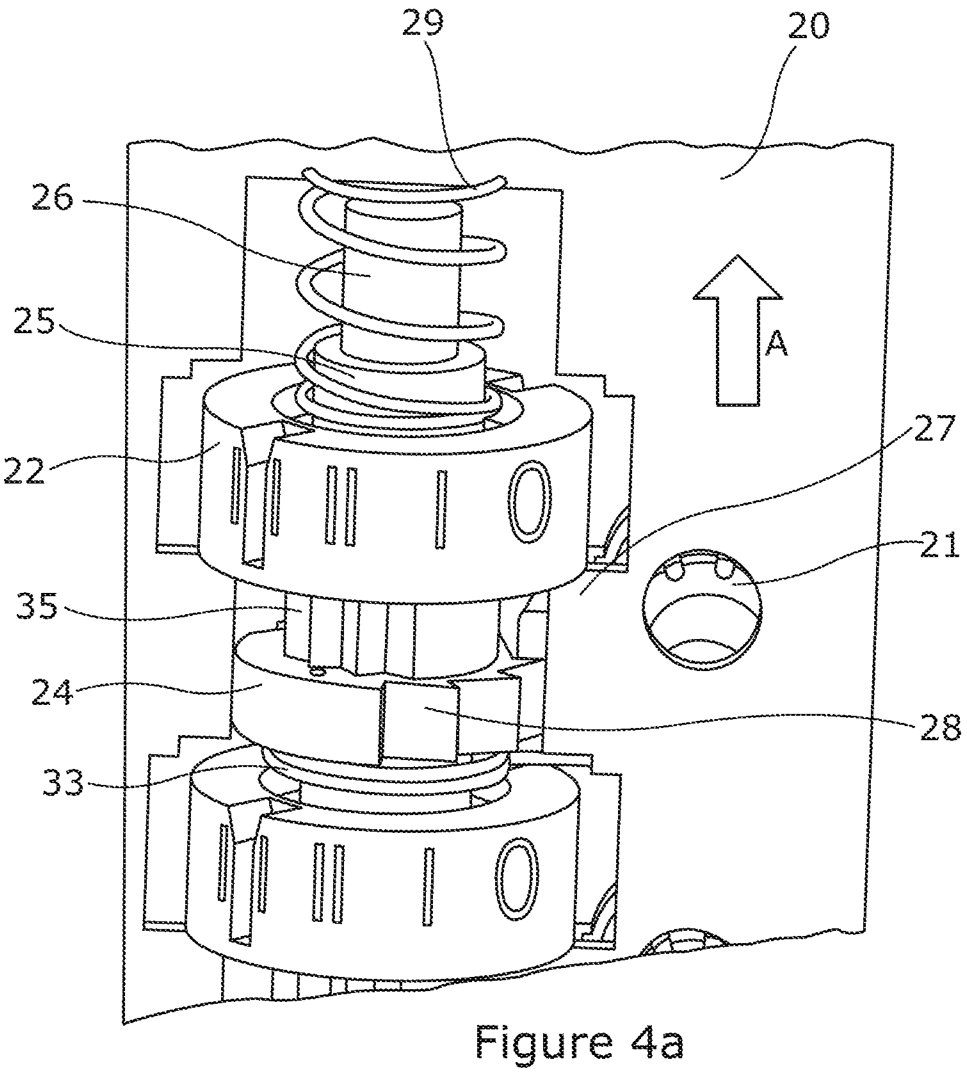
FIGS. 4*a* and 4*b* show back views of portions of a lock in the code changing function.

FIG. 4*a* shows a back view of a section of the lock in the code changing function. To enter the code changing function the latch 17 must be disengaged, the plunger 16 pulled away from the housing 12 and the elongate member 15 turned in an anti-clockwise direction, as described above in relation to FIG. 1*b*. This causes the actuator 14 to lift the locking plate in an upwards direction (shown by direction A on FIG. 4*a*). Consequently, the projections 27 of the locking plate 20 disposed underneath each of the locking wheels 22 lifts the locking wheels 22 out of engagement with the splines or projections 35 on the tubular portions 25 of the ratchet sleeves 24. The locking wheels 22 may then be manually rotated by the user to select the code combination (as described below).

Figure 4B:
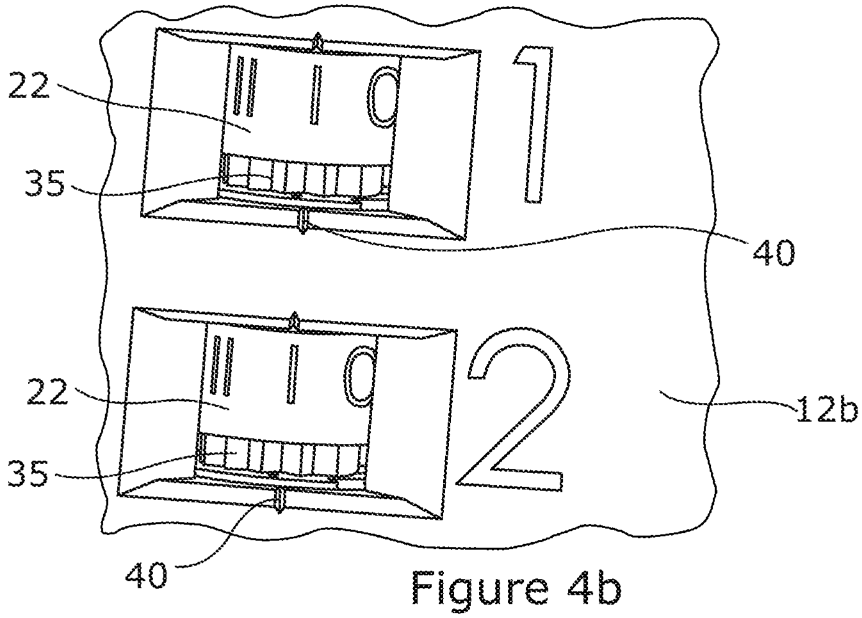

FIG. 4*b* shows what the user would see from the back section of the lock 10 in the code changing function. In this embodiment, the housing 12 comprises a back section 12*b* comprising a plurality of apertures through which the locking wheels 22 are accessible. As shown, the locking wheels 22 comprise a series of marking (0, I, II, III), these correspond to the number of presses or incremental rotations needed to align the notches 23 with the projections 27 of the locking plate 20 when the corresponding marking is aligned with the indication 40 on the back section of the housing 12*b*. The locking wheels 22 are associated with the buttons 11 representing the numbers written or engraved or otherwise marked next to the locking wheel 22.

In FIG. 4*b*, the locking wheels corresponding to the buttons representing numbers 1 and 2 must each be pressed once for the notches 23 of these locking wheels 22 to be aligned with the corresponding projections 27 in the locking plate 20. Thus, the code to disengage the latch comprises the numbers 1 and 2 once (in any order).

Figure 5:
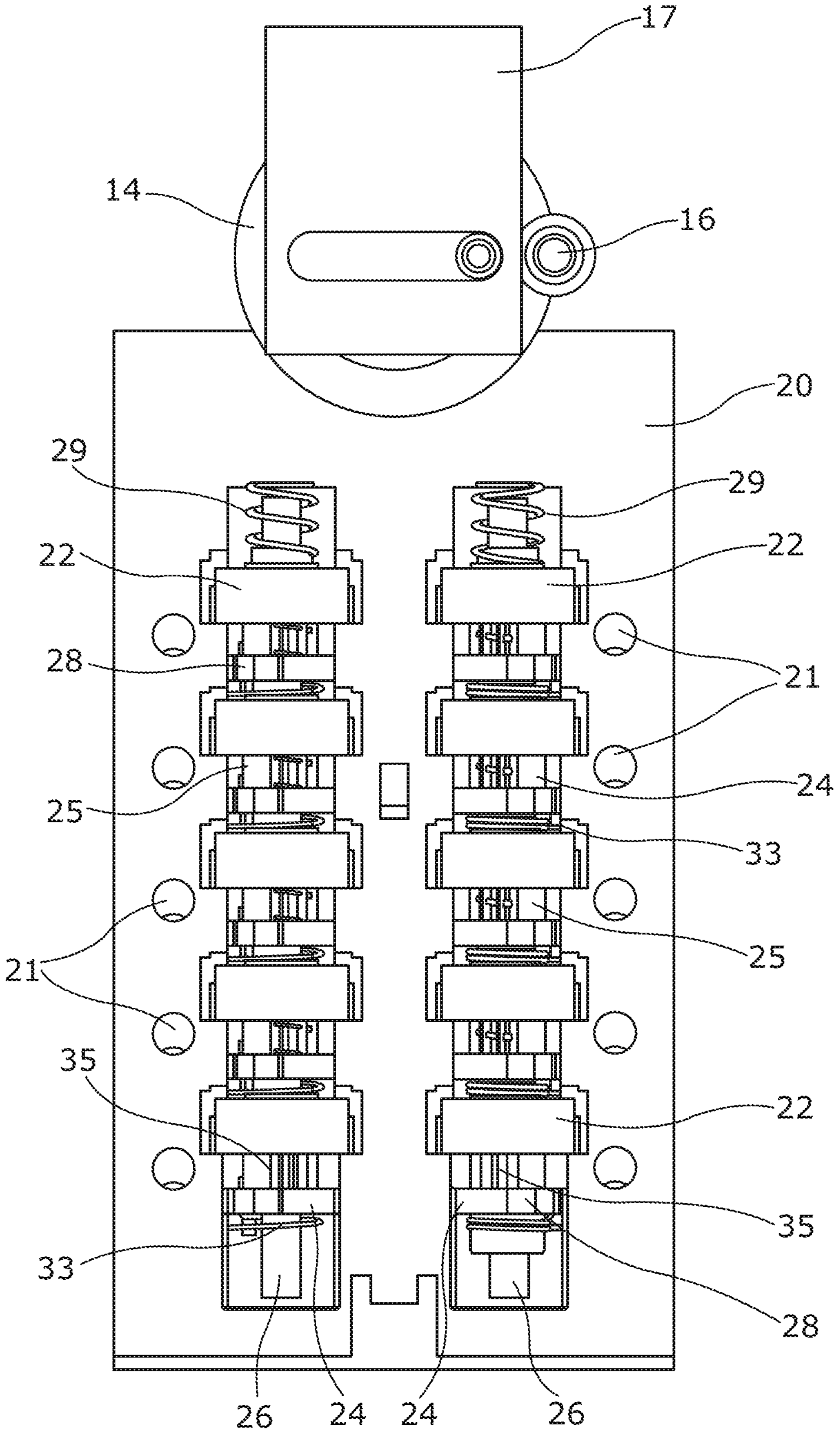
FIG. 5 shows a back view of a portion of the lock in FIG. 1*a* in the code changing function.

FIG. 5*a* shows a section of the interior of the lock in FIG. 1*a* in the code changing setting (i.e. in the same setting as shown in FIGS. 4*a* and 4*b*).

Figure 6:
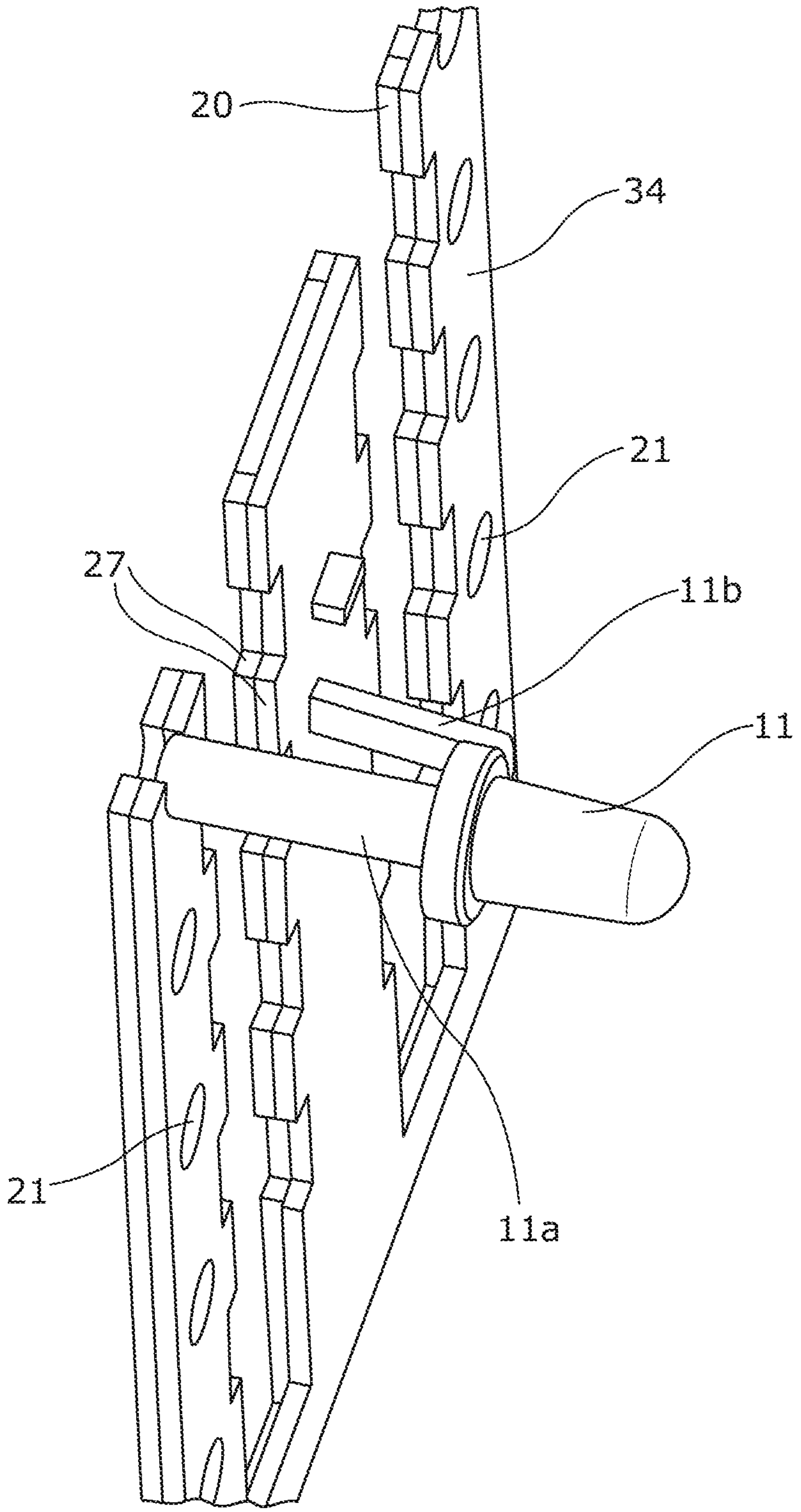
FIG. 6 shows a front perspective view of a portion of a lock according a second embodiment of the present invention.

FIG. 6 shows a front perspective view of a section of the interior of a lock according to a second embodiment of the present invention. A guide plate 34 is disposed in front of the locking plate 20, wherein the guide plate 34 also comprises a plurality of holes 21 and projections 27 the same size and shape as, and aligned with, those of the locking plate 20. In some embodiments, the guide plate 34 may not be coupled to the actuator 14 or to the locking plate 20, such that the guide plate is disposed in a fixed position.

Figure 7:
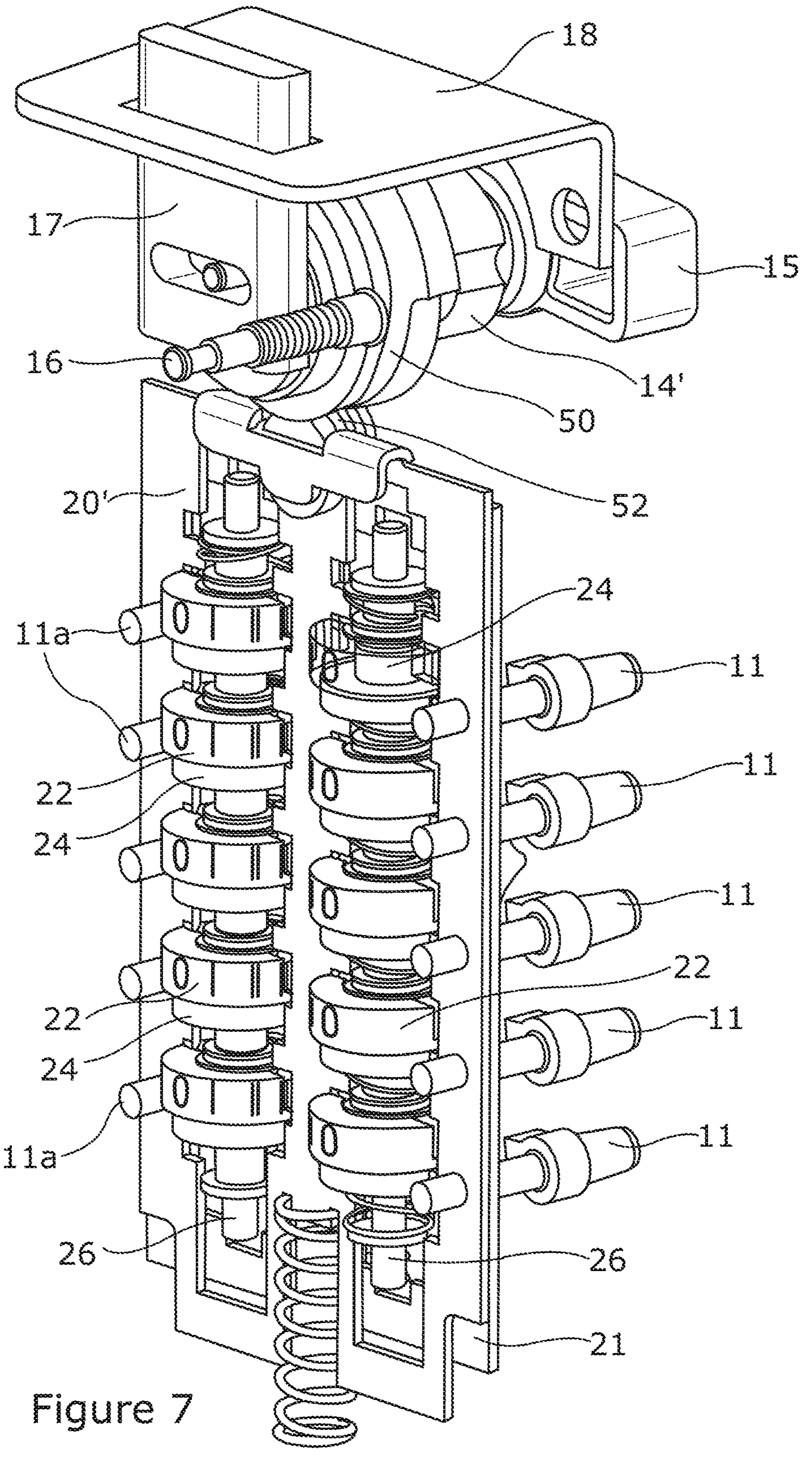
FIG. 7 shows a back perspective view of a portion of a lock according to a third embodiment of the first aspect of the invention.

A third embodiment of a section of lock 10 according to the invention is shown in FIG. 7. Features which are common to both FIG. 7 and FIGS. 1 to 6 are labelled accordingly. The top right locking wheel 22 is shown as transparent to show the ratchet sleeve 24.

In contrast to the lock section of FIG. 1*b*, the actuator 14' in FIG. 7 does not directly move the locking plate 20'. Instead, the actuator 14' is in engagement with a cam 50. A follower (or cam follower) 51 is disposed on the locking plate 20'. Turning the elongate member 15 rotates the cam 50 which is arranged to push the follower 51 downwards, thereby moving the locking plate 20' downwards towards the second position. If the projections on the locking plate 20' are aligned with the notches in the locking wheels 22 then the locking plate 20' moves to the second position and the latch 17 is withdrawn through an opening in the keep 18 and the lock 10 is unlocked. Providing the cam 50 and follower 51 may be advantageous as this may provide better control of the timing of the locking plate 20'.

Figure 8A:
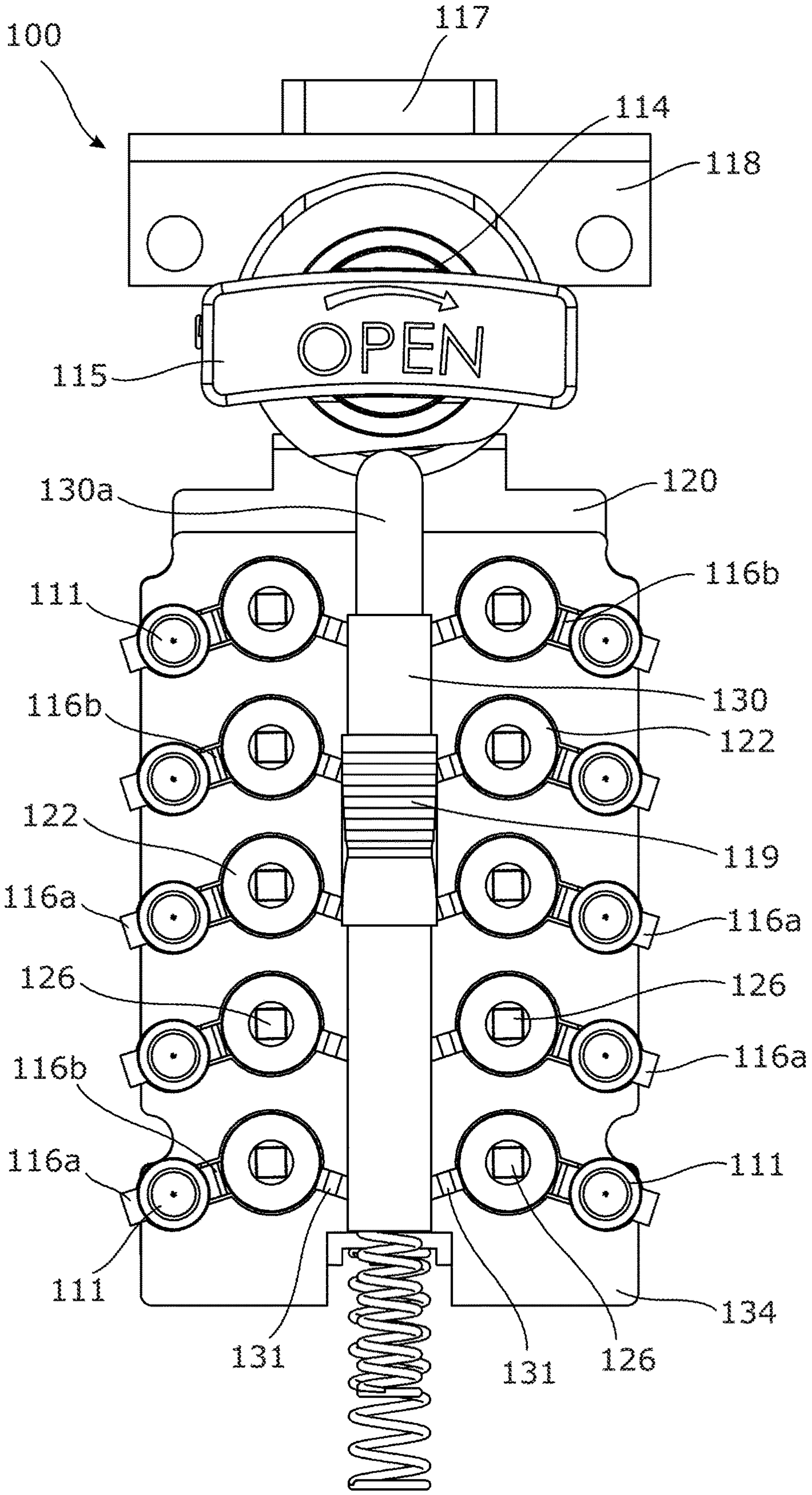
FIG. 8*a* shows a front view of a lock according to a fourth embodiment of the invention.
Figure 8B:
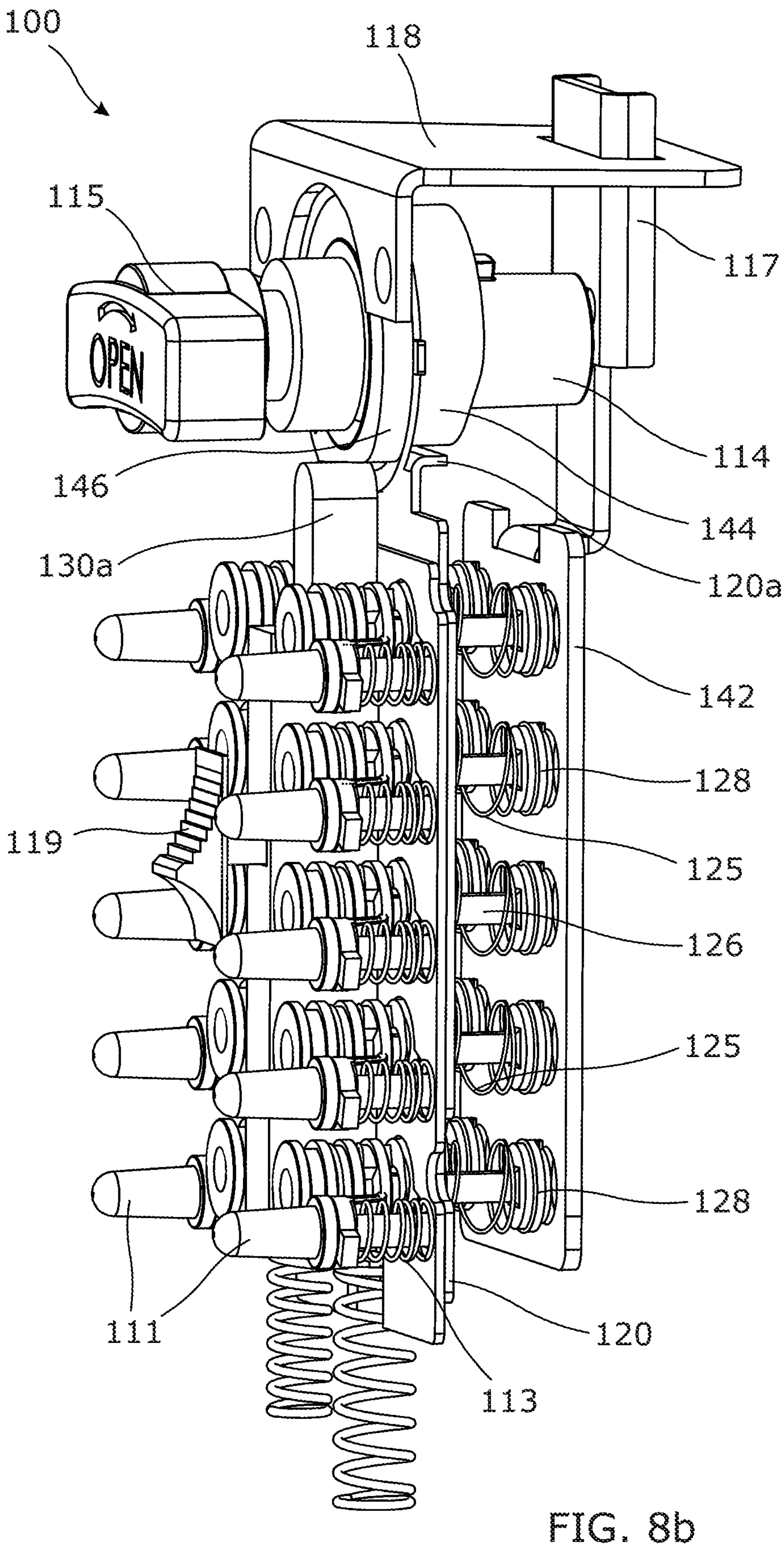
FIG. 8*b* shows a side perspective view of the lock in FIG. 8*a;*
Figure 8C:
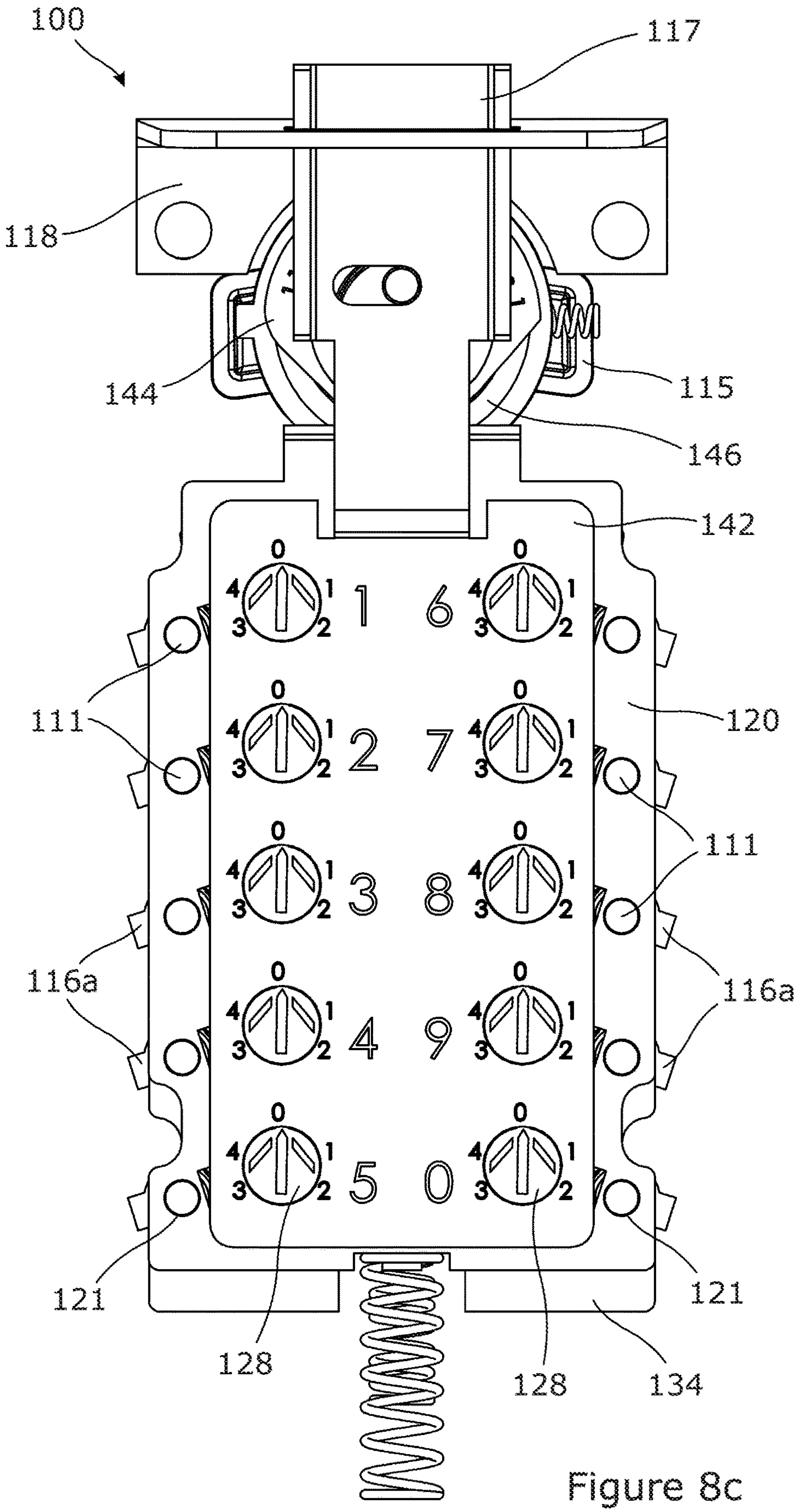
FIG. 8*c* shows a back view of the lock in FIG. 8*a;*

FIGS. 8*a* to 8*c* show a lock 100 according to a fourth embodiment of the invention. The lock housing has been removed to show the interior of the lock mechanism.

The lock 100 comprises an actuator 114 having a handle (or elongate member) 115. In this example, when the handle 115 is turned clockwise the actuator 114 disengages latch 117, thereby unlocking the lock 100. When latch 117 is disengaged it is retracted through an opening in a latch plate 118.

To disengage the latch 117 a user must axially press one or more of the buttons 111 a predetermined number of times and turn the handle 115 clockwise. Each of the buttons 111 can be pressed more than once. A biasing member 113 comprising a spring biases each button 11 towards the un-pressed position, therefore when the user removes the pressing force the button 111 returns to the un-pressed position.

A shaft of each of the buttons 111 is configured to be insertable through one of a plurality of holes 121 in a locking plate 120 (see FIG. 8*c*). In other embodiments, only one column of buttons 111 may be provided, or more than two columns of buttons 111 may be provided.

The lock 100 further comprises a plurality of rods 126 extending generally parallel to the shafts of the buttons 111 (i.e. parallel to the axis in which the buttons 111 can be depressed), wherein each rod 126 is mounted adjacent to one of the buttons.

On each rod 126 is mounted a spool 122. Each spool 122 comprises a plurality of circumferential grooves 123, each circumferential groove 123 having a notch 124 extending over a portion of the groove. The notches 124 on a given spool 122 are angularly displaced relative to each of the other notches 124 on that spool.

Each rod 126 comprises a head 128 arranged to be accessible through one or more apertures in the back section of the housing (not shown).

A biasing spring 125 is also inserted onto each rod 126 and is in communication with the corresponding spool 122. The springs 125 biases the plurality of spools 122 towards their starting (e.g. un-pressed) position.

A plurality of retention members 131 are connected by a central connecting member 130. A spring may exert a biasing force on the connecting member 130, such that if the connecting member is displaced from the position shown in FIG. 8*a* (i.e. moved upwards or downwards), it returns to that position. The retention members 131 and the connecting member 130 may be referred to as a centipede.

When each of the retention members 131 is disposed (or engaged) in one of the grooves 123 in the corresponding spool 122 (as shown) the retention member 131 retains the spool 122 in that position until the corresponding button 111 associated with the spool 122 is pressed.

An annular member 116*a* is inserted onto the shaft of each of the buttons 111, such that the locking plate 120 is disposed between the annular member 116*a* and the head of the button 111. Each annular member 116*a* comprises a leg 116*b* extending therefrom, wherein the leg 116*b* is arranged to be disposed in a groove 123 of the adjacent spool 122. In other embodiments, the legs 116*b* may be coupled to the buttons 111.

A latch panel 142 is connected to the latch 117. The latch panel 142 comprises a plurality of holes (or apertures), wherein when the latch 117 is engaged the holes are aligned with the heads 128 of the rods 126. Conversely, when the latch 117 is withdrawn through the latch plate 118 (i.e. disengaged), the holes are not aligned with the heads 128 of the rods 126, thereby preventing the user from attempting to set the code combination.

The switch 119 connected to the central member 130 is a reset actuator configured to clear (or zero) any button presses previously made when a user slides switch 119 downwards. This is achieved by translating the central member 130 downwards such that the retaining members 131 are not in communication with the spools 122, causing the biasing members 125 translate the spools 122 back to their starting positions.

FIG. 8*b* shows a side perspective view of the lock 100. A first cam 144 and a second cam 146 are in communication with the actuator 114. When the handle 115 is turned in a clockwise direction the first cam 144 is arranged to move a follower 120*a* disposed on the locking plate in a downwards direction. If the lock plate 120 is not blocked by one or more spools 122 then the actuator can then engage the second cam 146 to move a follower 130*a* disposed on the central member 130 in a downwards direction. Thus, there exists a lag between the movement of the first 144 and the second 146 cam. A shim may be disposed between the first cam 144 and the second cam 146.

FIG. 8*c* shows a back view of the lock 100 (without the surrounding housing). To set the lock code or code combination, a user must first enter the current code to withdraw the latch 117 and gain access to the back of the lock 100. The user must then re-engage the latch 117 by turning the handle 115 of the actuator 114 anti-clockwise. If the latch 117 is not engaged then the latch panel 142 will block the heads 128 of the rods 126 as explained above.

The user may then rotate one or more of the heads 128 of the rods 126 to set the new code combination. The number (e.g. 0, 1, 2, 3, 4) marked around the head 128 that the arrow on each head 128 is pointing to determines the number of presses of the corresponding button which is needed to unlock the lock.

The arrow may be formed of one or more recesses in the head 128 into which a screwdriver or other implement may be inserted to rotate the rod 126. The number (e.g. 0-9) of the button 111 with which each rod 126 is associated is also indicated (or marked) on the latch panel 142 using larger numbers.

Figure 9:
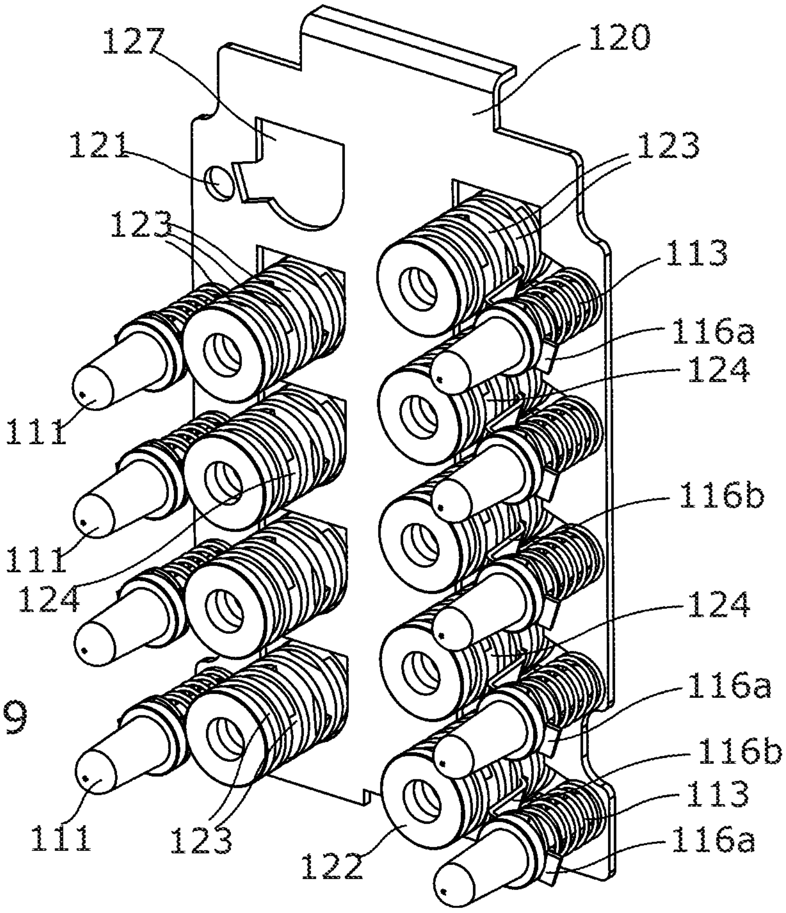
FIG. 9 shows a front perspective view of a portion of a lock in FIG. 8*a;*

The interaction between the spools 122, locking plate 120 and the buttons 111 is shown more clearly in FIG. 9.

The locking plate 120 comprises a plurality of apertures 127, each aperture sized to receive one of the spools 122 therethrough. When one of the buttons 111 is pressed, the leg 116*b* associated with the button 111 exerts a force on the spool 122 with which it is in contact. The leg 116*b* translates the spool 122 through the aperture 127 in the locking plate 120 by one groove 123. The annular member 116*a* is then pivoted, when the button is no longer pressed, to move the leg 116*b* out of contact with the groove 123 of the spool and returned to its un-pressed position. Substantially simultaneously, the corresponding retention member 131 snaps back to engage the next (i.e. adjacent or subsequent) groove 123 on the spool 122, as the retention member 131 reaches its maximum pivot angle.

When the biasing member 113 returns the button to the un-pressed position the leg 116*b* hits a stop and then pivots back to sit clear of the grooves 123 of the spool 122. When the button is subsequently pressed against the biasing member 113, the leg 116*b* and annular member 116*a* are pivoted back towards the spool 122 to engage the next (i.e. adjacent or subsequent) groove 123 on the spool 122.

When correct code combination has been entered (i.e. each button has been pressed a predetermined number of times) the notch 124 in the groove 123 which is positioned adjacent to the aperture 127 is aligned with the top (i.e. in this case, straight) surface of the aperture 127. If the handle 115 is then turned in a clockwise direction, the actuator 114 moves the first cam 114 which pushed the locking plate 120 downwards such that the surface of each aperture 127 engages the notches 124 in the spools 122. The second cam 146 then moves the central member 130 downwards to disengage the retention members 131 from the spools 122, such that the spools 122 are held in position by the locking plate 120. The latch 117 is then withdrawn into the latch plate 118 and the lock 100 is unlocked.

Figure 10:
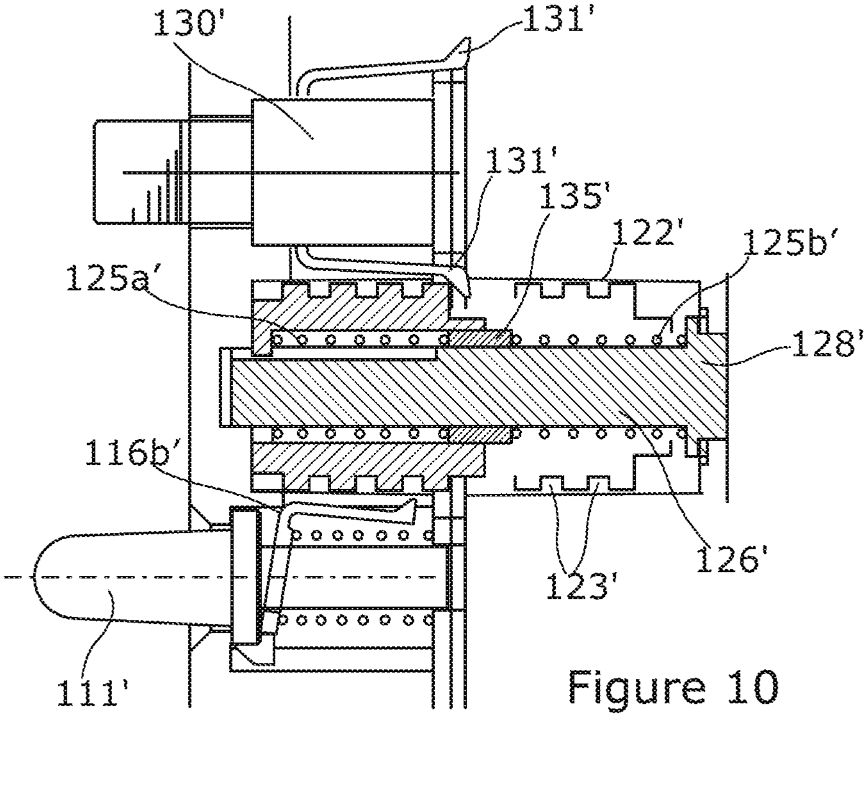
FIG. 10 shows a schematic drawing of a plan view of a portion of a lock according to a fifth embodiment of the invention.

FIG. 10 is a schematic, cross-sectional illustration of a fifth embodiment of the invention. In FIGS. 8*a* to 8*c* each spool 122 is mounted on an end of one of the rods 126, and a spool biasing member 125 is threaded onto the exterior of each spool 122 and also mounted on the rod 126. Conversely, as shown in FIG. 10, the spool biasing member comprises a first spring 125*a*' and a second spring 125*b*'. The first and second springs 125*a*', 125*b*' are separated by a differential sleeve 135'. The sleeve 135' is configured to provide a differential sliding motion. The rods 126' and first and second springs 125*a*', 125*b*' are disposed internally to the spools 122' (e.g. substantially received within an internal cavity of each spool 122'). This may significantly reduce the width of the lock, making it more compact. The buttons 111', legs 116*b*', central member 130' and retention members 131' may be the same as the corresponding features in FIGS. 8*a*-8*c*.

Figure 11A:
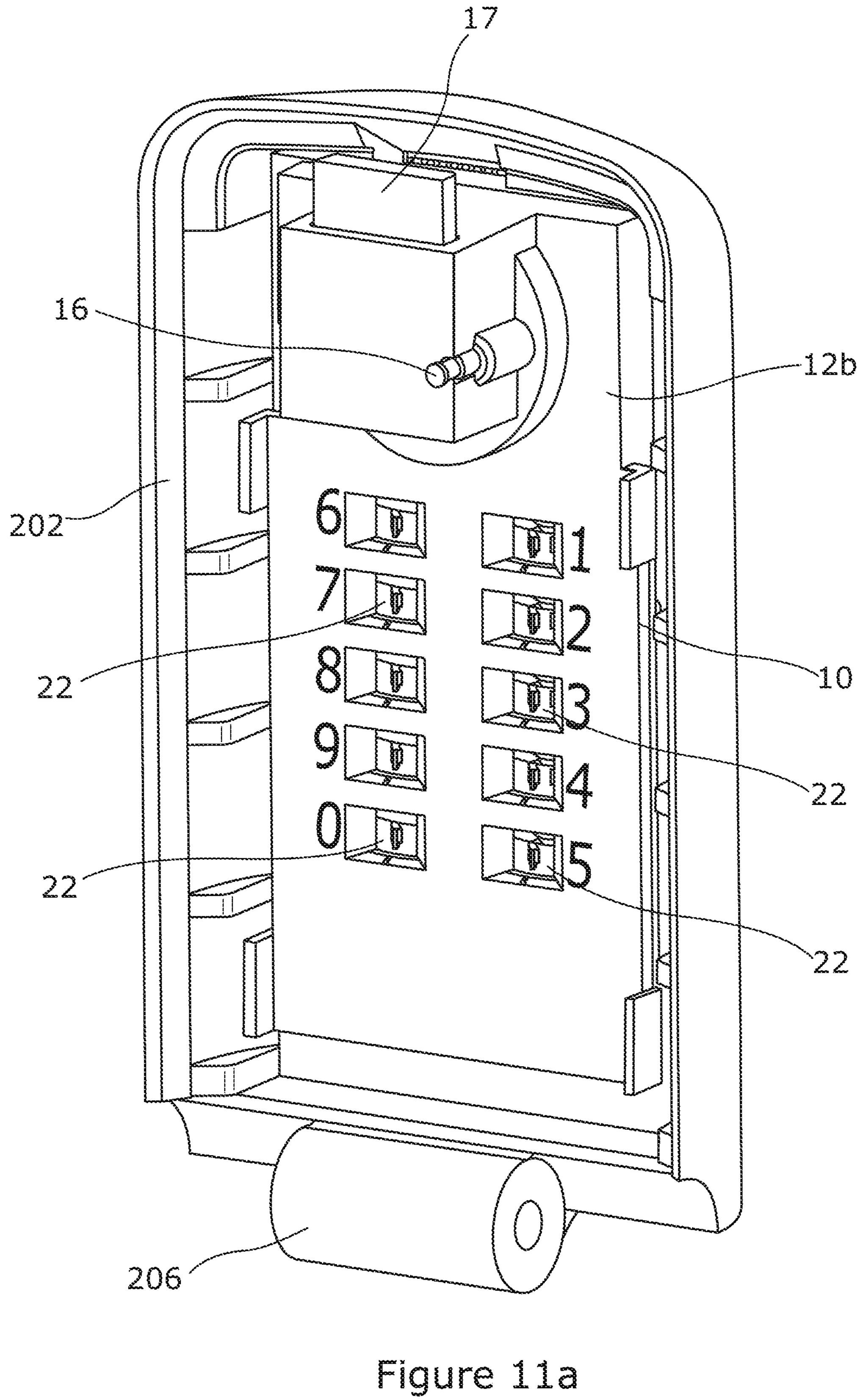
FIG. 11*a* shows a back perspective view of the door section of a lockable enclosure according a sixth embodiment of the invention.

In a sixth embodiment of the invention, FIG. 11*a* shows a door 202 for a lockable enclosure 200 comprising a lock 10 of the present invention. The lock 10 is mounted into the interior cavity of the door 202 and the latch 17 of the lock 10 is configured to lock and unlock the door 202 to a body of the lockable enclosure when the latch 17 is engaged and disengaged respectively.

The door 202 is configured to pivotably attach to the base of the body 201 of the lockable enclosure 200 at hinge 206.

The plunger 16 extends from the back section 12*b* of the lock housing and the locking wheels 22 are accessible through apertures in the back section 12*b* of the housing when the door 202 is in an open position.

Figure 11B:
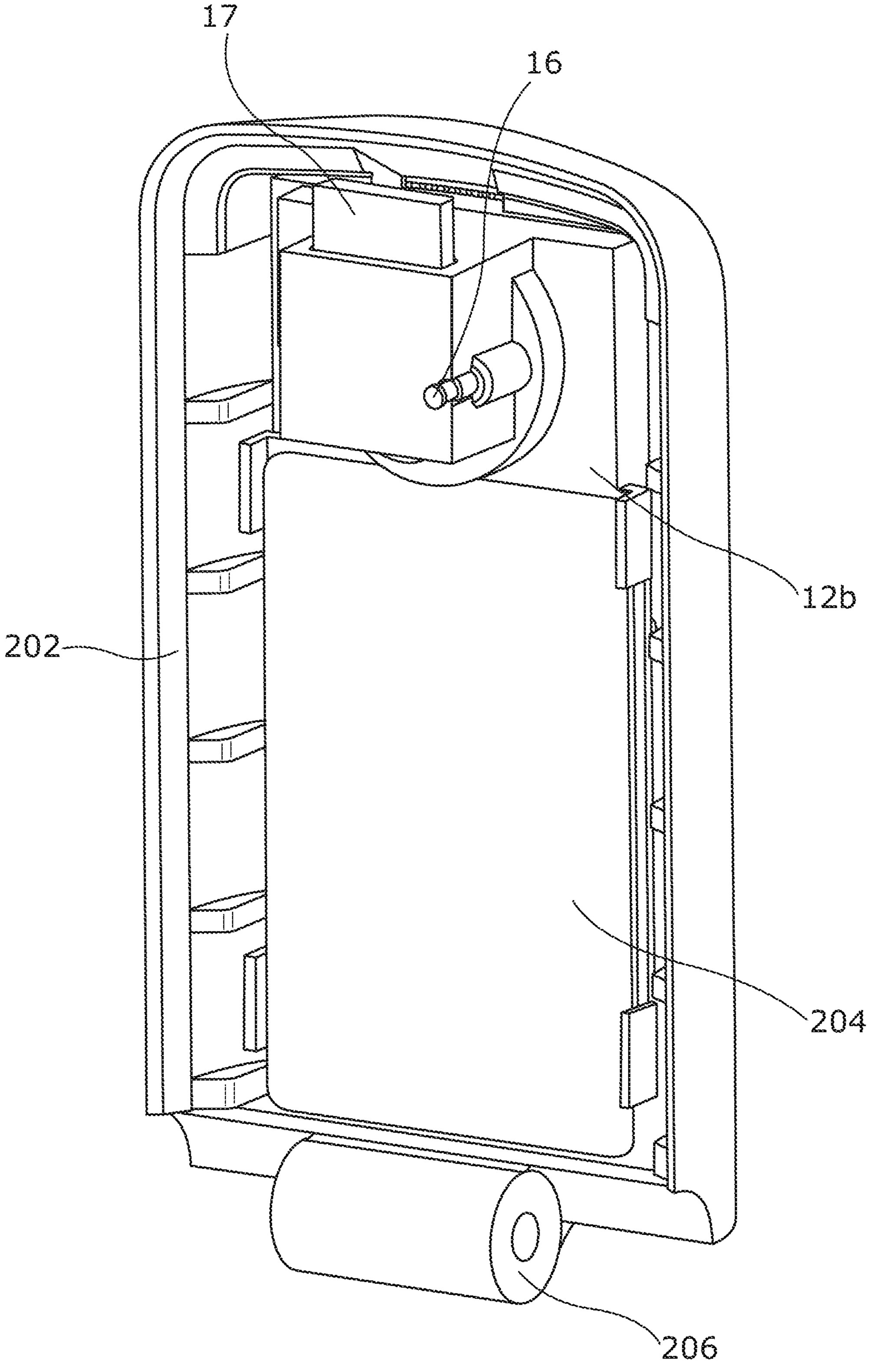
FIG. 11*b* shows a back perspective view of the enclosure of FIG. 6*a;*

In FIG. 11*b*, a removable cover 204 is positioned at least partially over the back section 12*b* of the housing, to cover the locking wheels 22. The removable cover 204 must be removed by the user (when the door 202 is in an open position) to allow the user to change the code combination of the lock.

Figure 11C:
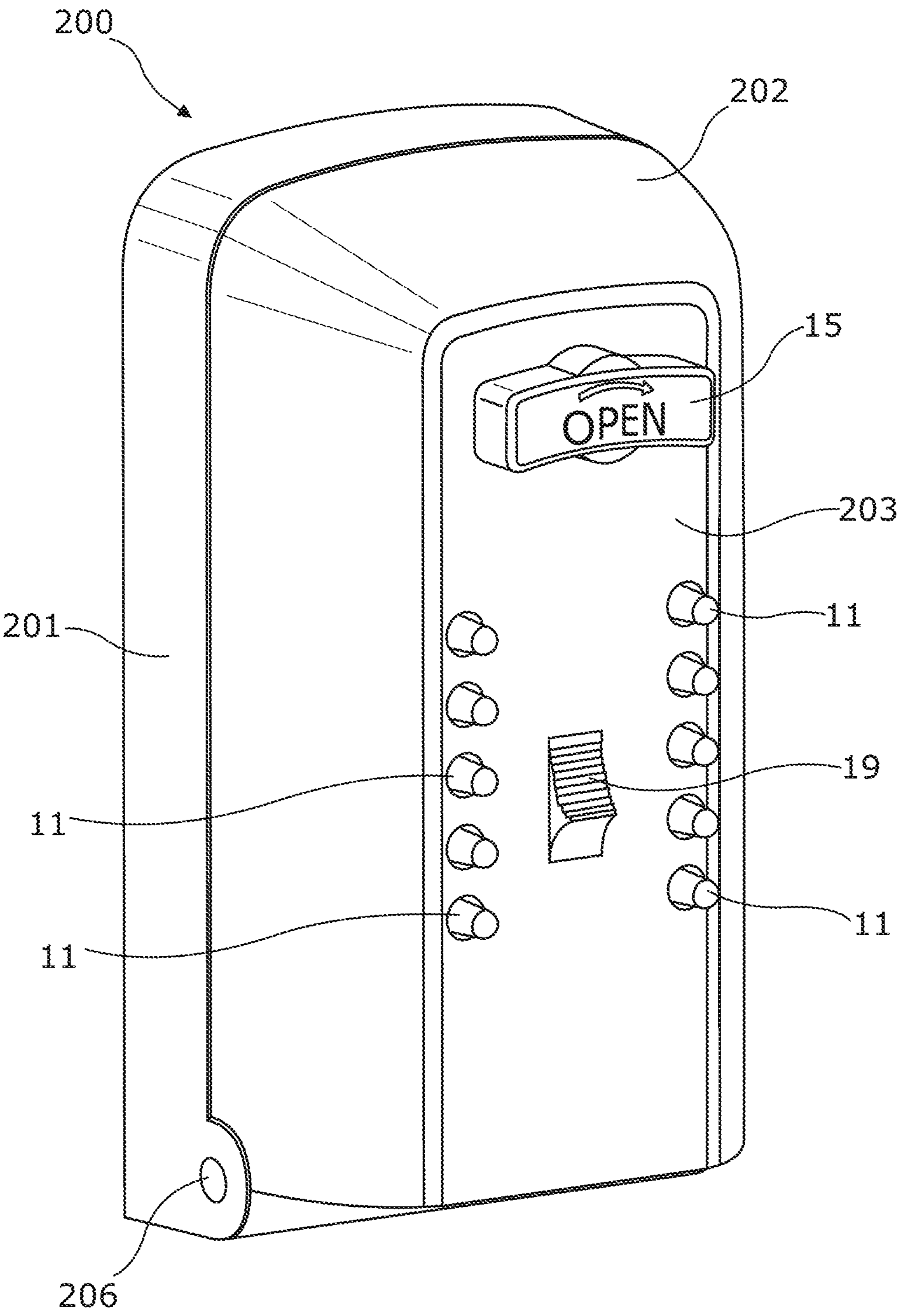
FIG. 11*c* shows a front perspective view of a lockable enclosure comprising the door section of FIG. 11*a* or 11*b;*

FIG. 11*c* shows a fully assembled lockable enclosure 200, wherein the door 202 of FIG. 6*a* or 6*b* is pivotably attached to the body 201 at hinge 206. The body 201 defines a cavity therein for storing one or more removable articles. The body may comprise one or more hooks for hanging the articles thereon (not shown). In the example shown in FIG. 11*c*, the lockable enclosure is a key safe configured to store one or more keys.

The front section 12*a* of the lock housing may form the front panel 203 of the lockable enclosure, or a front panel 203 may be placed over the front section 12*a* of the lock housing. The buttons 11, switch 19 and elongate member 15 are as described in connection with FIG. 1*a*.

The lockable enclosure 200 in FIGS. 11*a*-11*c* could equally comprise the lock 100 of the fourth embodiment of the invention, shown in FIG. 8*a* to FIG. 10.

Figure 12:
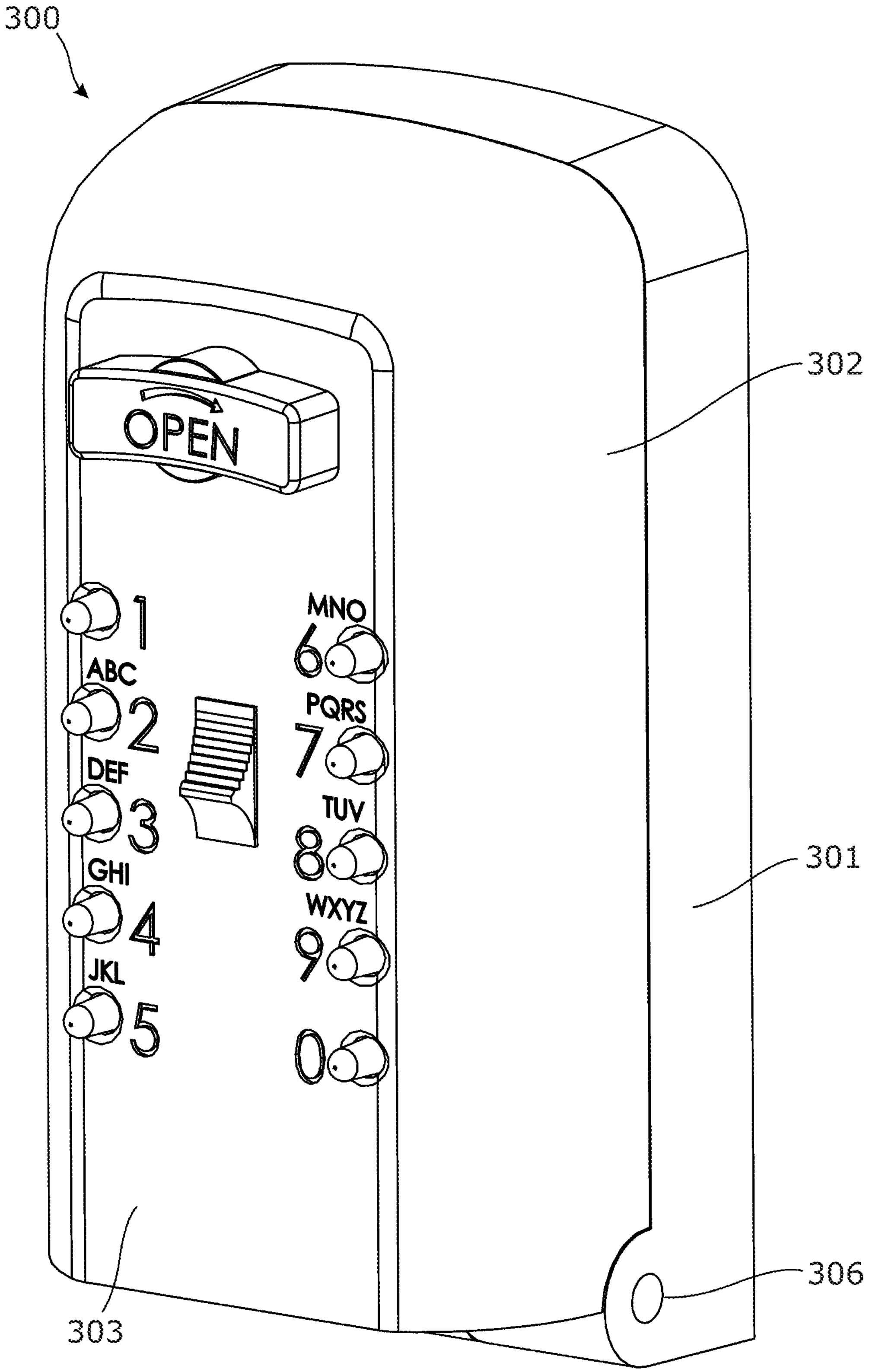
FIG. 12 shows a front perspective view of a lockable enclosure according to a seventh embodiment of the invention.

In a seventh embodiment of the invention, FIG. 12 shows another example of a fully assembled lockable enclosure 300 according to the invention. The lockable enclosure may comprise any lock according to the invention (e.g. lock 10 or lock 100). As in FIG. 11*c*, the enclosure 300 is a key safe comprising a door 302 pivotably attached to the body 301 of the enclosure at hinge 306. The body 301 defines a cavity therein for storing one or more removable articles (e.g. keys, credit cards, etc.). The body may comprise one or more hooks for hanging the articles thereon (not shown). In FIG. 12, the front panel 303 of the door 302 comprises additional letter markings adjacent to some of the buttons 11, 111 such that the buttons corresponding to numbers 2 to 9 also correspond to three or more letters. In the example shown, the letters are in the Latin (or English) alphabet, however, in other examples the letters may be from other alphabets (e.g. Russian, Greek, Arabic, Japanese, etc.).

Optionally, the numbers can be printed on the buttons such that when a light shines through the buttons the number is visible to the user.

Figure 13:
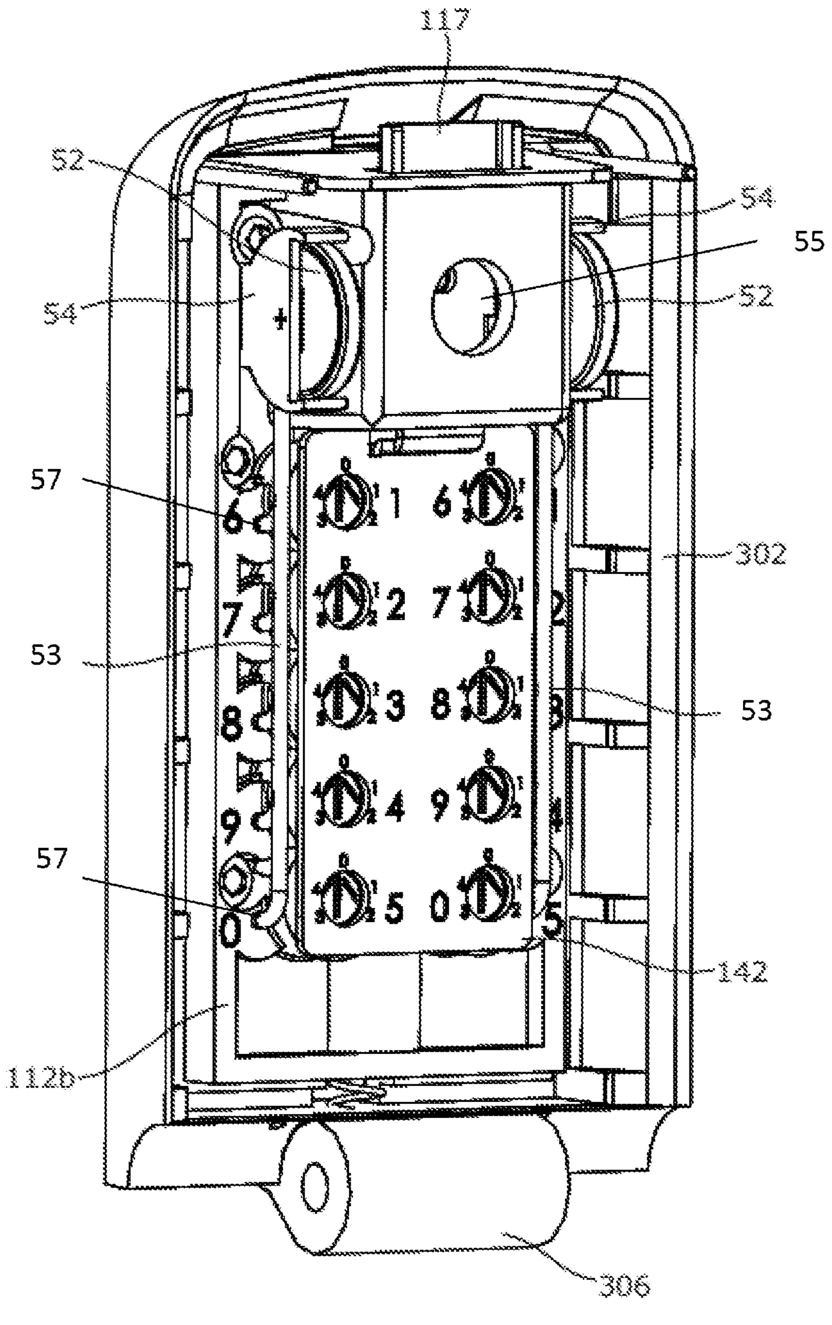
FIG. 13 shows a back perspective view of the door section of a lockable enclosure according an eighth embodiment of the invention.

FIG. 13 shows a back perspective view of a door of a lockable enclosure (for example, door 302 of FIG. 12) comprising a lock 100 of the present invention (as shown in FIGS. 8*a*-8*c*). The lock 100 comprises a housing, the housing having a back section 112*b*. A pair of batteries 52 (e.g. lithium cells, or other long live and/or rechargeable batteries) are mounted to the housing 112*b* in battery holders 54. As shown, the batteries 52 and holders 54 may be conveniently positioned either side of the actuator mechanism, as this is typically wasted space in a lockable enclosure and does not reduce the space for storing articles. In other examples, only one battery may be required.

At least one light source 55 is electrically connected to each of the batteries 52. Each light source 55 is configured to transmit light to a light pipe 53. In the examples shown, two light pipes 53 are provided. In other example there may be more, or less than two light pipes. Each light pipe 53 is configured to transmit the light to one or more of the buttons 111. For example, the light pipe may comprise a plurality of outlets 57 operable to emit light, wherein each outlet 57 is inserted through an aperture in the lock housing 112*b* such that the outlet 57 is in communication with one of the buttons 111. The buttons 111 may comprise transparent material which may act as a light guide. The provision of the light sources 55, light pipes 53 and batteries 52 may make it easier for a user to enter the correct code combination at night and/or in a darkened room (for example, during a power cut).

Alternatively, the door 302 in FIG. 13 may comprise the lock 10 of the first aspect of the invention.

Figure 14:
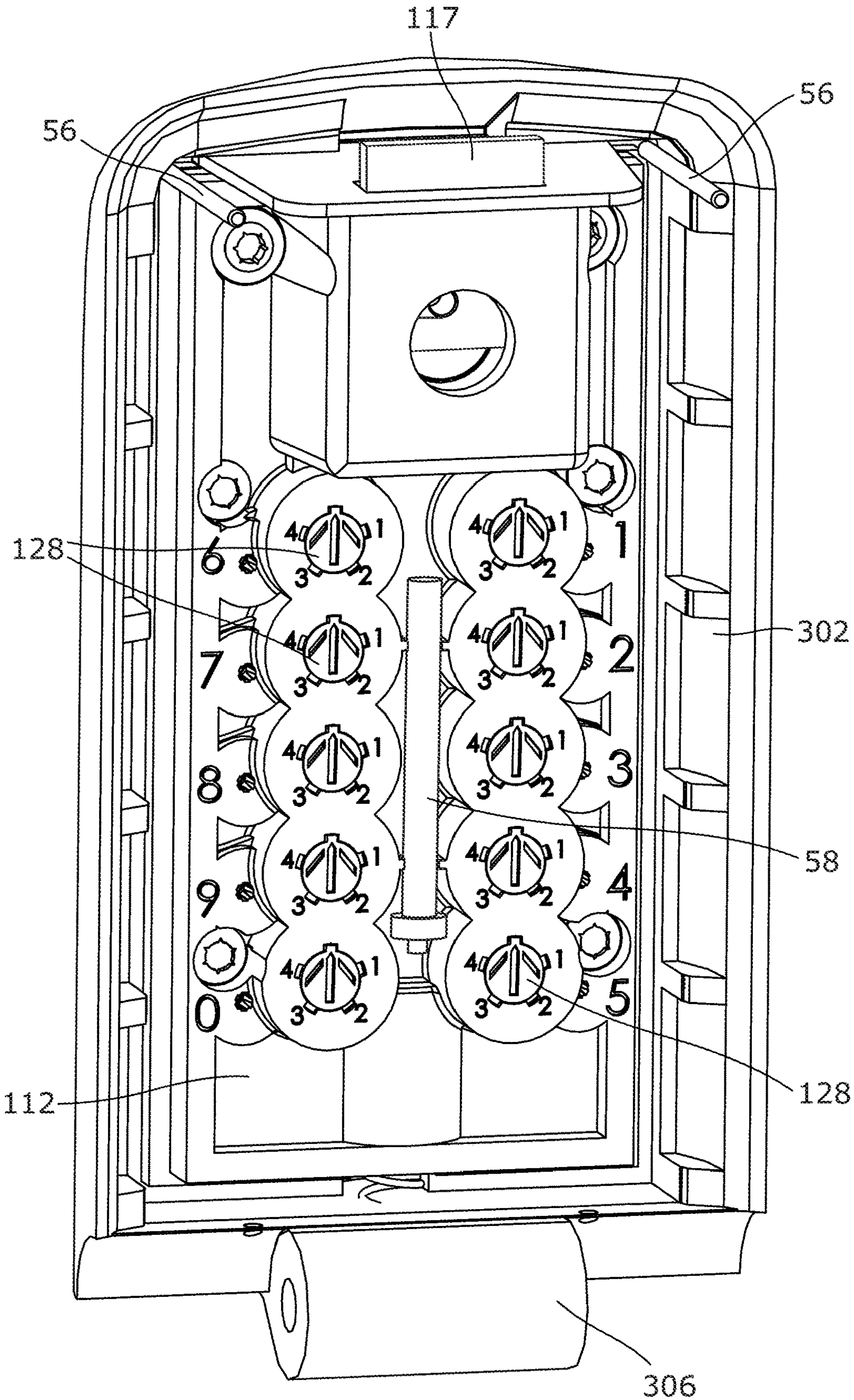
FIG. 14 shows a back perspective view of the door section of a lockable enclosure of FIG. 13.
Figure 15:
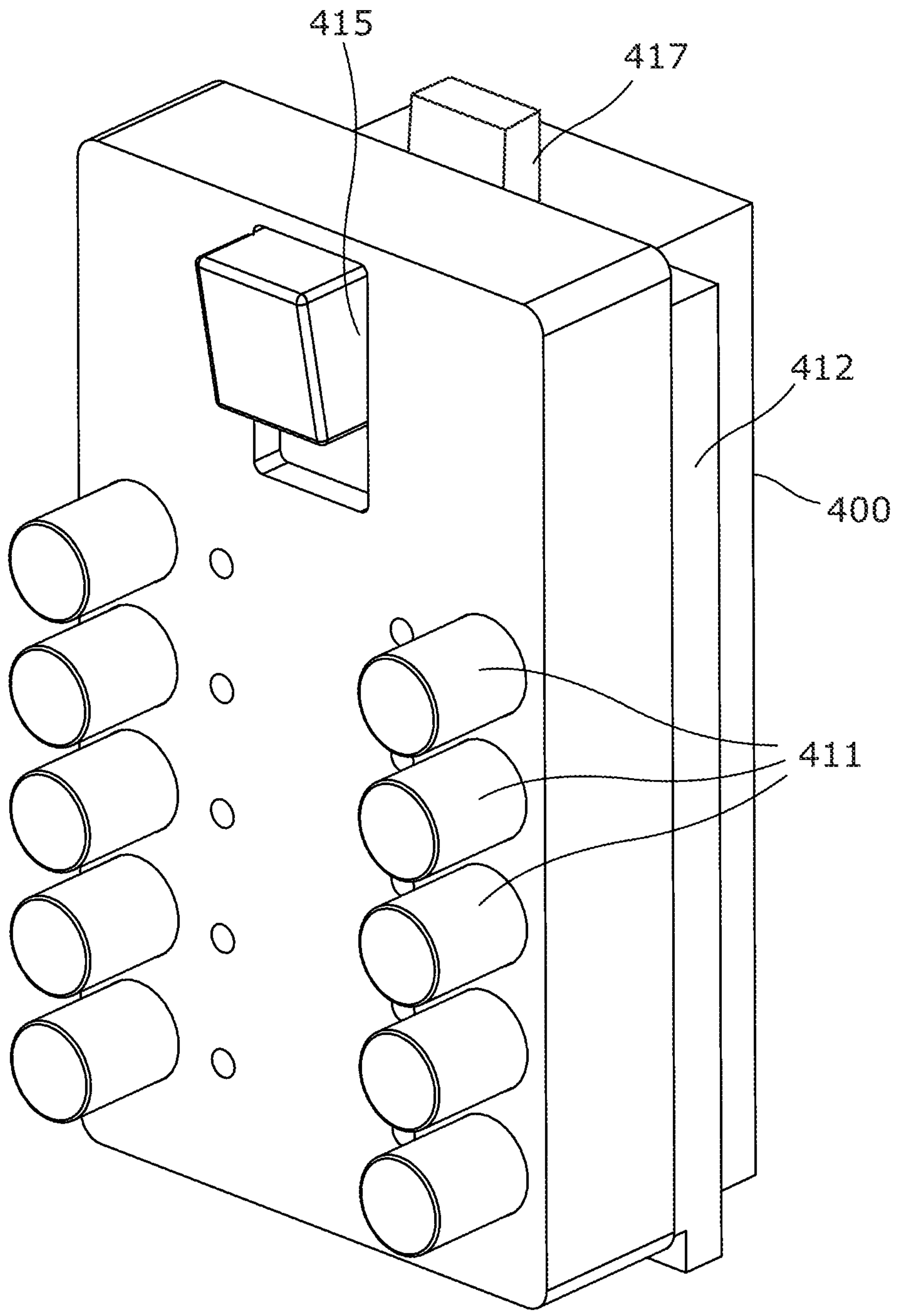
FIG. 15 shows a perspective view of a lock in accordance with a ninth embodiment of the invention.
Figure 16:
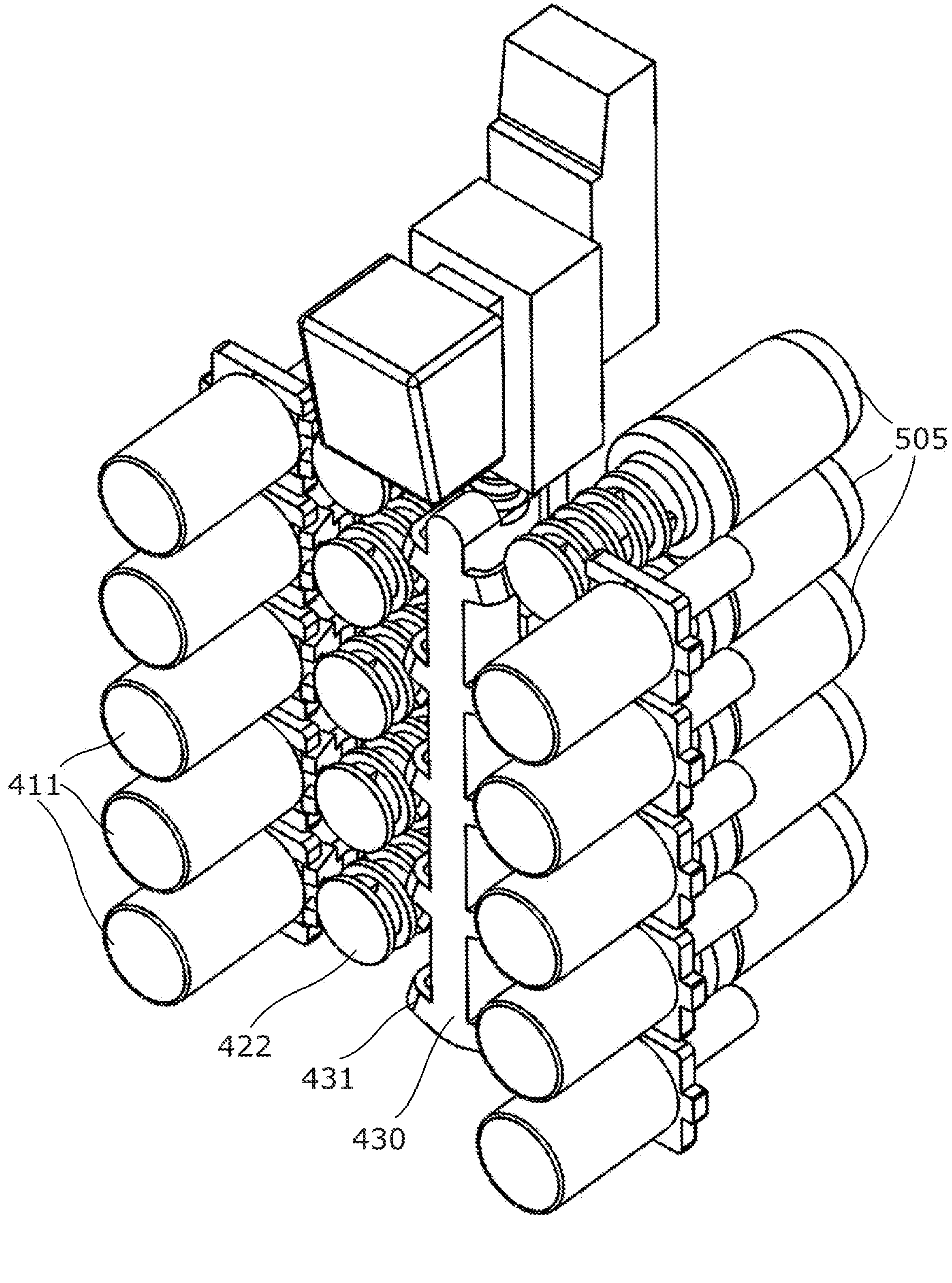
FIG. 16 shows a partially exploded perspective view of the lock of FIG. 15.
Figure 17:
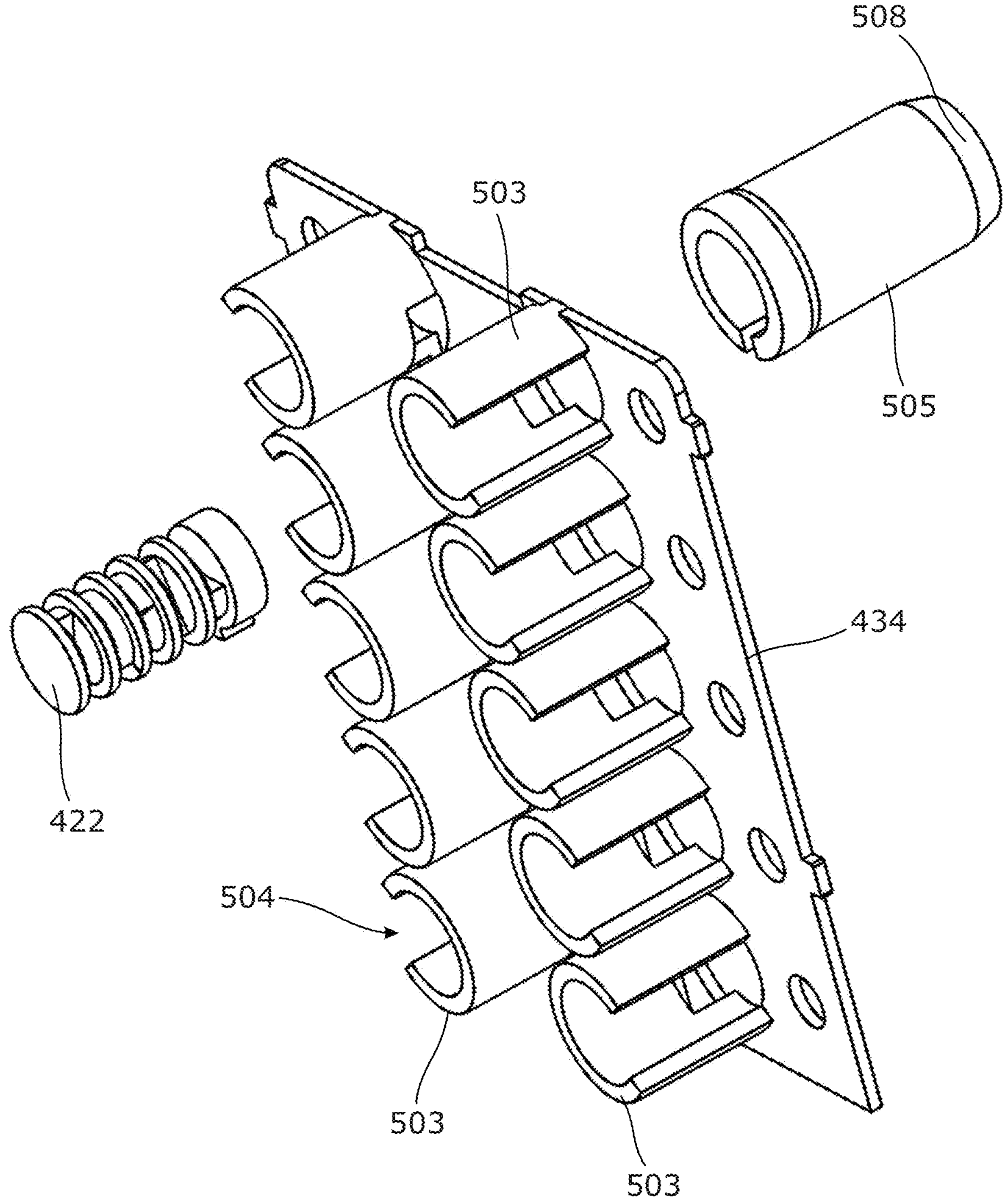
FIGS. 17 and 18 show exploded perspective views of parts of the lock of FIG. 15.
Figure 18:
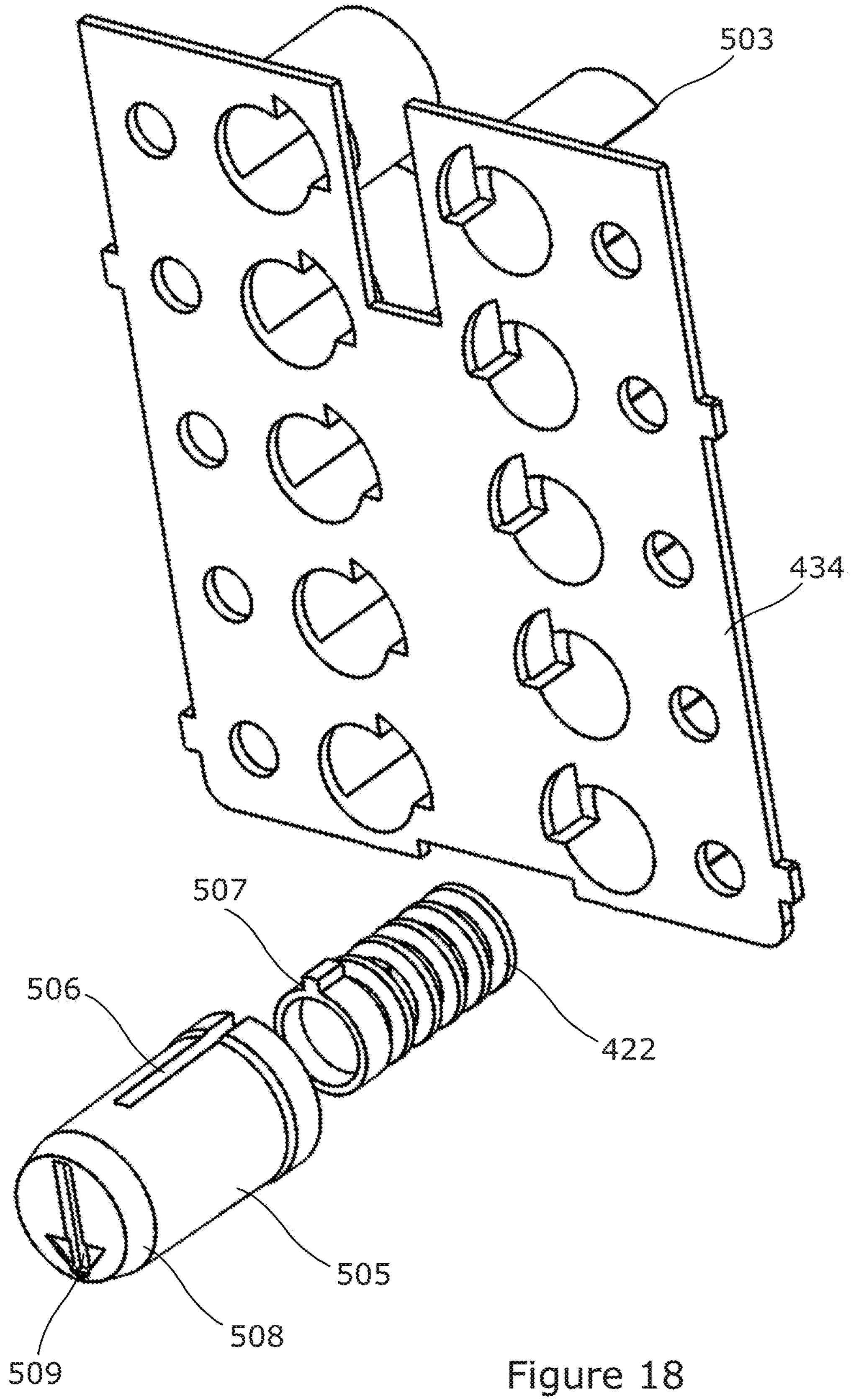
Figure 19:
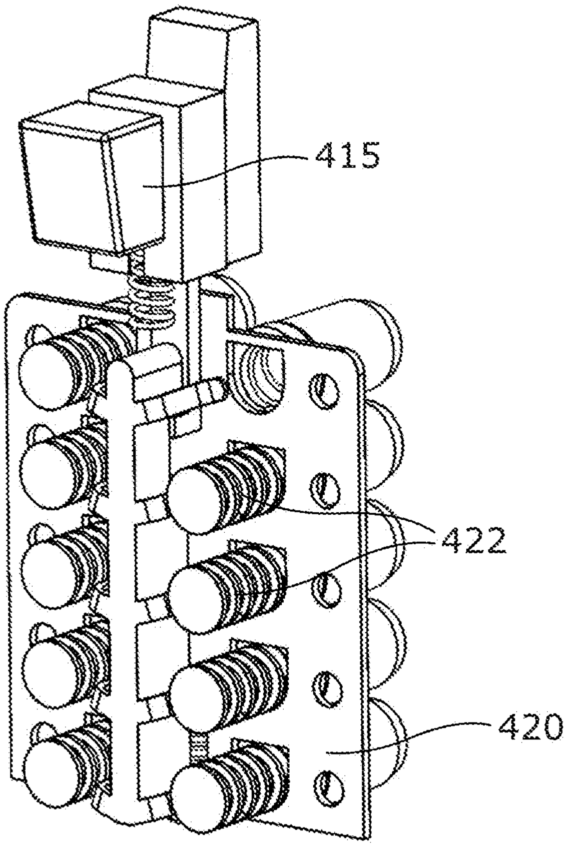
FIGS. 19 to 24 show partially exploded perspective views of the lock of FIG. 15 as it is operated.

In an eighth embodiment of the invention, FIG. 14 shows a back perspective view of another example of a door of a lockable enclosure (for example, door 302 of FIG. 12) comprising a lock 100 of the present invention (as shown in FIGS. 8*a*-8*c*). The lock 100 comprises a housing, the housing having a back section 112*b*. Two elongate members (e.g. dowel pins) 56 are mounted to the back of the front panel 303 of the door. When the door 302 is in a closed position on the lockable enclosure 300 (e.g. as in FIG. 12), each of the elongate members extends at least partially, into the internal cavity of the body 301 of the lockable enclosure.

In this example, the elongate members 56 consist essentially of silicon nitrated (Si3Ni4) steel and the body 301 and door 302 of the lockable enclosure comprises zinc or a zinc alloy. Thus, the elongate members 56 are harder than the body and door of the lockable enclosure. In other examples, the at least one elongate member 56 may comprise, or consist essentially of, any material which is harder than high speed steel (HSS). As HSS is typically used to make saws, this may make it very difficult to saw through the elongate members 56 to forcibly open the door 302.

In FIG. 14, a tool 58 is also removably mounted to the lock housing 112*b*. A projection on an end of the tool 58 is configured to be insertable into the recessed arrow in the head 128 of each rod 126, such that the tool 58 may be used to rotate the rods 126 to set the code combination. This may be convenient as the user will not have to locate a screwdriver or other suitable implement whenever they wish to change to lock code.

The tool 58 may be provided in a lockable enclosure according to any embodiment of the second aspect of the invention.

A lock in accordance with a ninth embodiment of the invention is shown in FIGS. 15 to 26 of the accompanying drawings. In this embodiment, a lock 400 is shown, which could be used with a keysafe or for any other convenient use. Corresponding reference numerals to those used in the first embodiment have been used, raised by 400.

In this embodiment, rather than having a rotatable handle as in the previous embodiment, the lock 400 and in particular latch 417 is driven by a slider 415. However, it is possible that this embodiment could be employed with a rotating handle 15; 115 as in the previous embodiments.

Within the housing 412, there are again provided a plurality of buttons 411. The operation of this embodiment is largely the same as that of the fourth embodiment of FIGS. 8 to 9, except as described below.

Spools 422 are provided as before, as is a guide plate 434 in front of (with respect to the buttons 411) the locking plate 420. The guide plate has a part cylindrical protrusion 503 for each spool 422, which contain the spools 422 and provide guidance therefor. The protrusions 503 each have a circumferential gap 504 through which the leg 416*b* engages the spools 422 as explained below.

The buttons 411 each engage a spool 422 through a leg 416*b* via an annular ring 416*a* in a similar manner as to before. The pivoting of the annular portion on the button can clearly be seen in FIGS. 25 and 26 of the accompanying drawings, where a ridge 501 on the button 411 engaging a corresponding notch 502 in the annular ring 416*a*. Thus, as the button 411 is pressed, the leg 416*b* will pivot into the spool 422 to translate it one notch as in the FIGS. 8 to 9 embodiment.

As the spools 422 are translated by the action of the legs 416*b*, they are pushed through the guide plate 434 and locking plate 420. On the far side of these plates, each spool 422 is provided with a thimble-shaped sleeve 505. This guides the spool 422 as it passes through the plates 434, 420. Each sleeve 505 is also keyed to its spool 422 against relative rotational movement by means of a notch 507 on the spool 422 engaging a slot 506 in the sleeve. This means that the spool 422 and sleeve 505 cannot rotate relative to each other. Each spool contains a tapering spring 510 (visible with the spool 422 removed in FIG. 22 of the accompanying drawings) which acts to bias the spool 422 out of the sleeve; however, the retention members 431 linked by connecting member 430 will hold the spools 422 in position after each translation by the legs 416*b*.

Thus, the code can be set by rotating the sleeves 505, as that will rotate the respective spools 422, thus changing the rotational position of the notches within the grooves of the spool 422 relative to the locking plate as in the FIGS. 8 to 10 embodiment. The sleeves have a beveled end 508, which allows them to be retained within the housing (in an area, such as the inside of a key safe that would be inaccessible with the lock and key safe locked) but still turn therewithin. An arrow 509 can be used to align the sleeve with indicia on the housing; this arrow 509 would be displayed in an aperture in the housing, but in the inaccessible area described above. Typically, the indicia would indicate where the sleeve would need to be positioned for 0, 1, 2 and so on presses of the corresponding button to position the spool so that the lock would open.

The operation of the lock can be seen with respect to FIGS. 19 to 24 of the accompanying drawings; in these drawings the buttons 411 and some spools have not been shown to aid visibility of other parts. In the position shown in FIG. 19 of the accompanying drawings, the slider 415 is in its uppermost position. A user enters their code by pressing the appropriate buttons 411 some number of times so that the spools 422 are translated a certain number of times.

Figure 20:
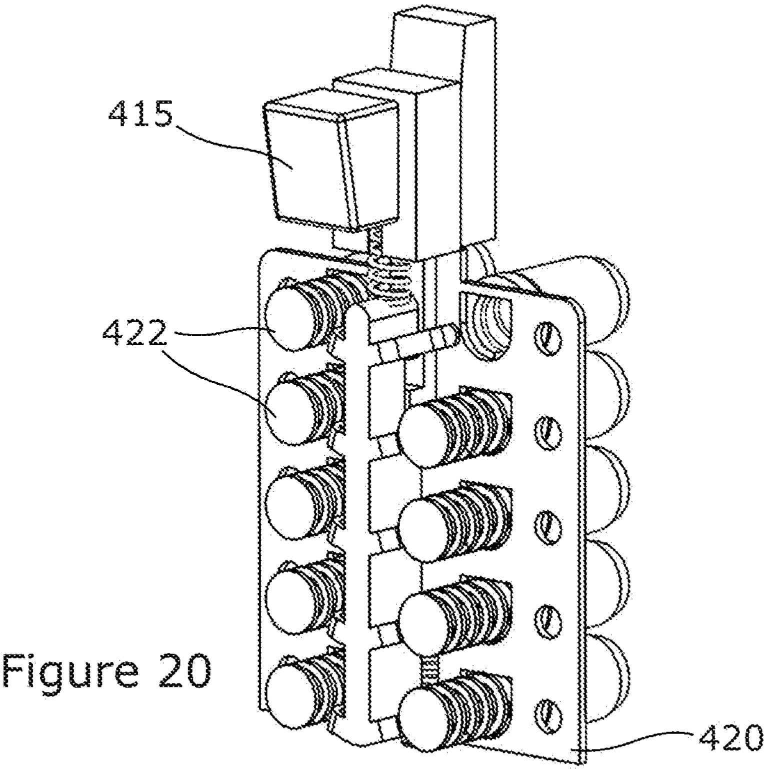

In FIG. 20 of the accompanying drawings, the slider 415 contacts the locking plate 420, and starts to push it down, presuming that the spools 422 are all in the correct position to all the locking plate 420 to move. If any of the spools 422 are not aligned so that their notches are aligned with the locking plate 420, the slider will not be able to move.

Figure 21:
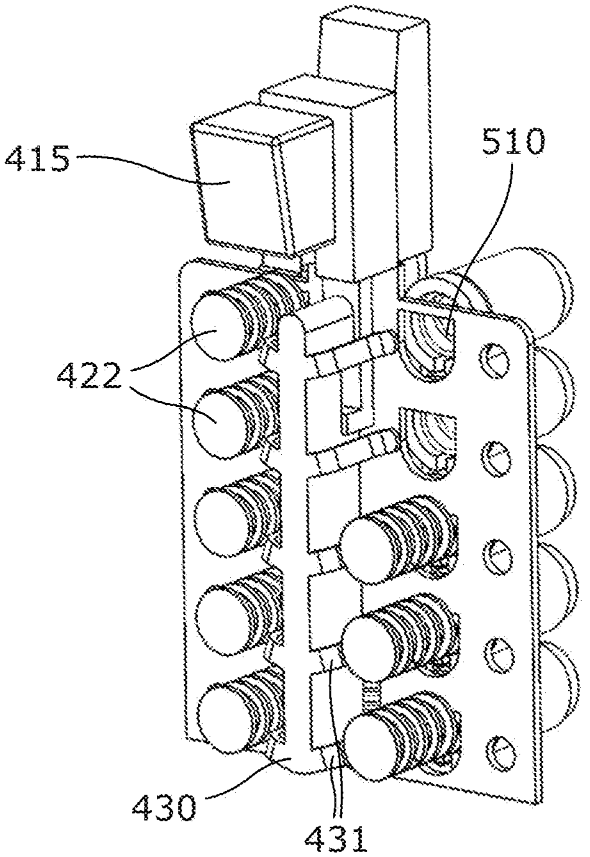

In FIG. 21, the slider 415 continues its downward travel. It engages the connecting member 430, which moves the retaining members 431 clear of the spools, which will now be held against the force of the springs 510 by the locking plate 420.

Figure 22:
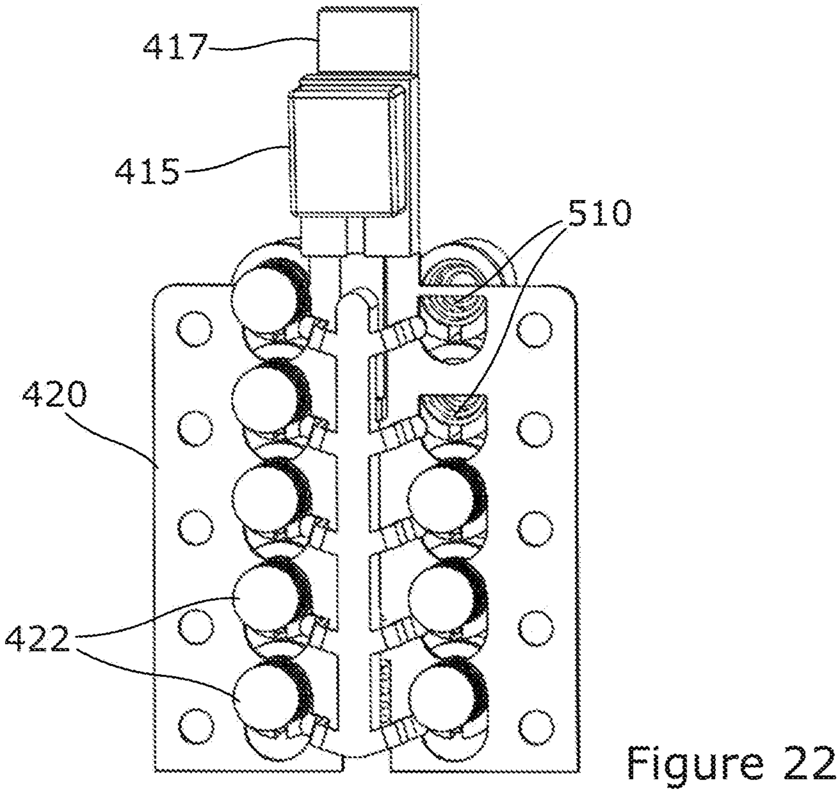

In FIG. 22, the slider 415 has reached the bottom of its travel. The locking plate 420 is fully engaged, and the latch 417, which is coupled to the locking plate 420, will have fully retracted.

Figure 23:
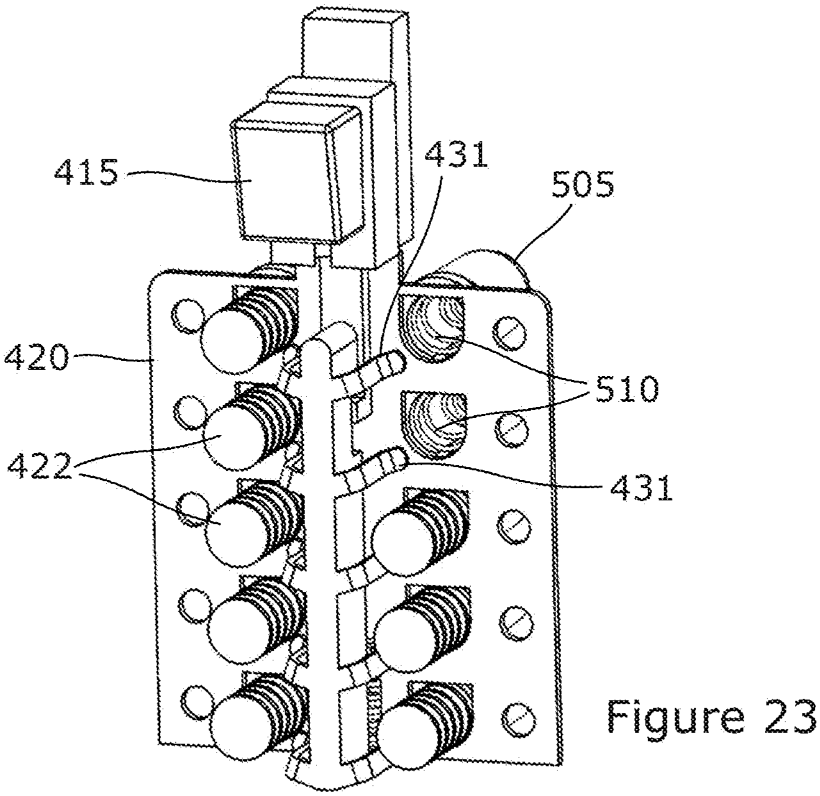

In FIG. 23, the slider returns upwards. The locking plate 420 will clear the spools before the connecting member 430 and the retaining members 431 reengage the spools 422. Thus, the springs 510 will move the spools 422 to an extreme of their travel in the direction out of the sleeves 505.

Figure 24:
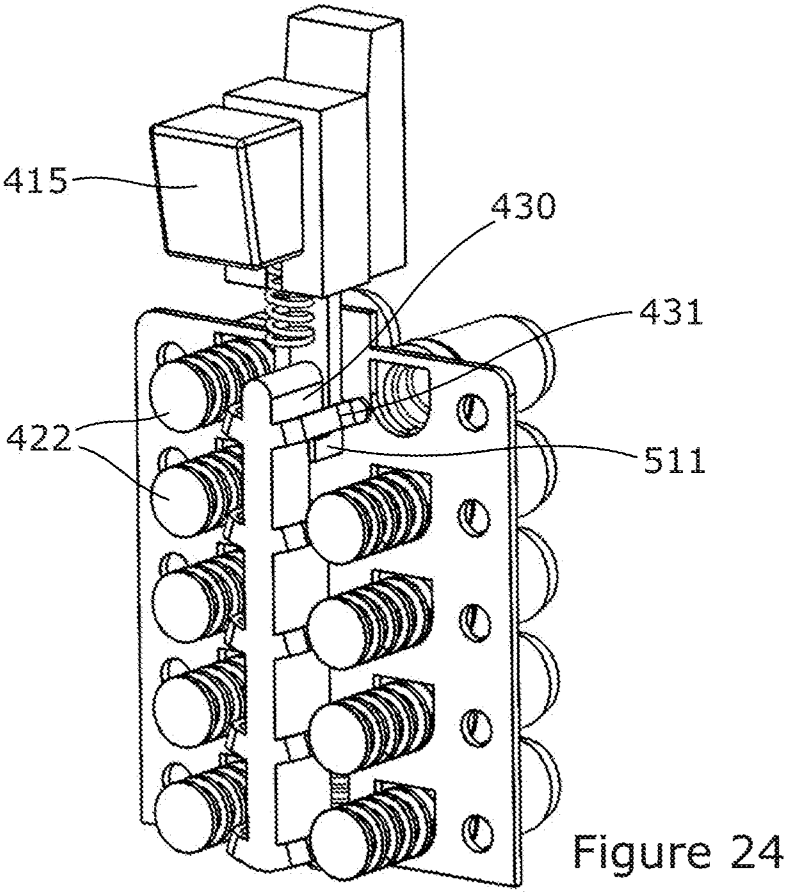
Figure 25:
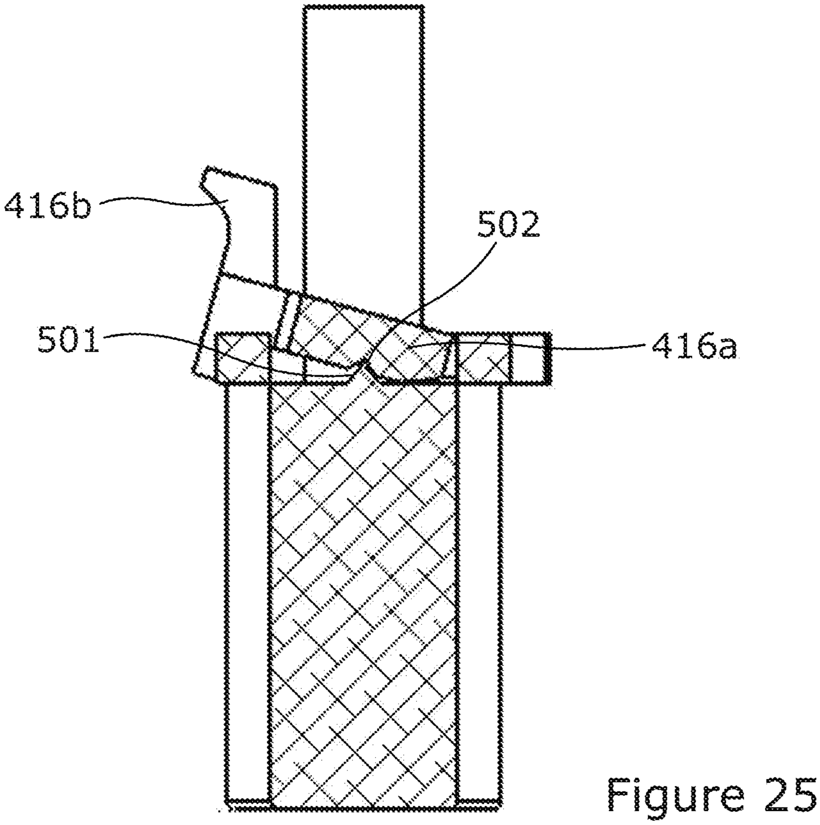
FIG. 25 shows a cross sectional view through a button of the lock of FIG. 15.
Figure 26:
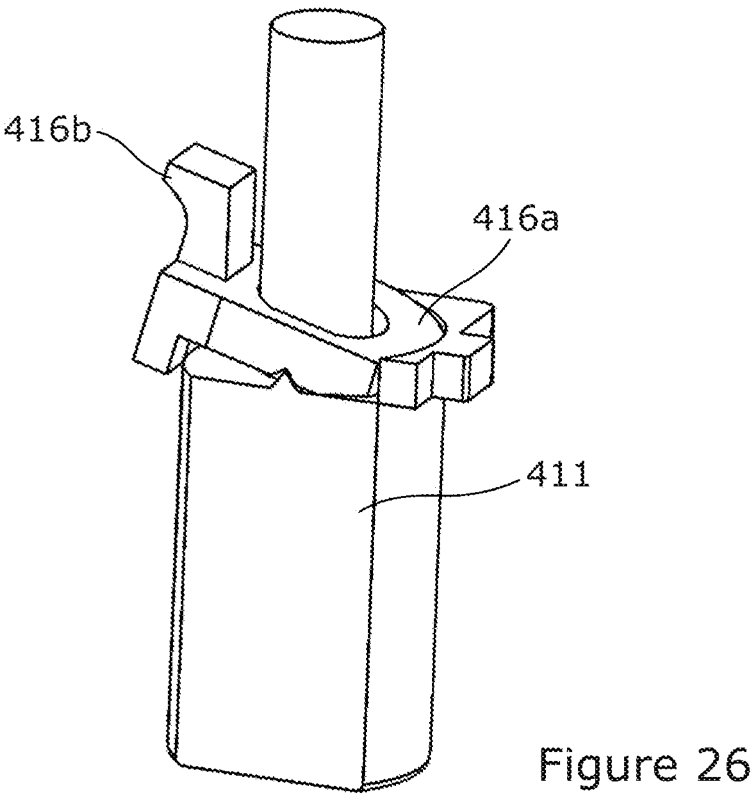
FIG. 26 shows a perspective view of the button of FIG. 25.

In FIG. 24, the slider 415 continues to its home position. A hook portion 511 engages the connecting member 430 to pull it back up into the position where the retaining members 431 engage the spool, ready for a user to enter their code once more.

We have found that the device of this embodiment can be made particularly compact and with less accurate manufacturing tolerances required.

The invention claimed is:

1. A lockable enclosure comprising:

a body having an internal cavity sized to contain one or more articles;

an opening through the body to permit access to the articles;

a door pivotably connected to the body, the door comprising a plurality of apertures each aperture receiving a button therethrough, wherein when the door is in a closed position the door covers the opening in the body;

a lock comprising a latch, wherein the latch must be disengaged to move the door to an open position thereby gaining access to the article(s) and wherein the latch is disengaged by pressing one or more of the buttons a predetermined number of times;

at least one light source;

the lock comprising a mechanical pushbutton locking mechanism arranged to disengage the latch and which does not require an electrical power source to maintain functionality of the mechanical pushbutton locking mechanism;

at least one power source in communication with the at least one light source, the at least one power source disposed internally to the lockable enclosure; and at least one light pipe in communication with the at least one light source, wherein the at least one light pipe is arranged to transmit light from the at least one light source to each of the buttons.

2. The lockable enclosure of claim 1, in which the at least one light source is mounted to the door of the lockable enclosure.

3. The lockable enclosure of claim 1, in which each button comprises transparent material which acts as a light guide.

4. The lockable enclosure of claim 3, in which an outer surface of each button consists essentially of a transparent material which is arranged to be illuminated by the light transmitted by the at least one light pipe.

5. The lockable enclosure of claim 1, in which the at least one power source comprises at least one battery mounted inside the door of the lockable enclosure.

6. The lockable enclosure of claim 5, in which the at least one light source is arranged to at least partially illuminate the internal cavity of the lockable enclosure when the door is in the open position.

7. The lockable enclosure of any of claim 1, comprising an additional light source located within the internal cavity of the lockable enclosure, wherein the additional light source is configured to, at least partially, illuminate the internal cavity of the lockable enclosure when the door is in an open position.

8. The lockable enclosure of claim 7, in which the at least one additional light source is connected to the same power source as the at least one light source.

9. The lockable enclosure of claim 1, comprising at least one sensor operable to detect when the door is in an open or closed position.

10. The lockable enclosure of claim 9, in which the at least one sensor is in communication with the at least one light source and the door of the lockable enclosure, such that when the door is in an open position the at least one sensor is arranged to transmit a signal to turn off the at least one light source.

11. The lockable enclosure of claim 10, in which the at least one sensor is arranged such that the signal is only transmitted if the door is in an open position for a predetermined period of time.

12. The lockable enclosure of claim 7, comprising at least one sensor operable to detect when the door is in an open or closed position, in which the at least one sensor is in communication with the additional light source and the door of the lockable enclosure.

13. The lockable enclosure of claim 12, in which the at least one sensor is arranged such so as to transmit a signal when the door is in an open position to turn on the additional light source.

14. The lockable enclosure of claim 1 in which the at least one light source comprises at least one LED.

15. The lockable enclosure of claim 7, further comprising a timer, in which the additional light source is in communication with the timer, arranged such that the additional light source can only remain turned on for a predetermined period of time.

16. A lockable enclosure comprising:

a body having an internal cavity sized to contain one or more articles;

an opening through the body to permit access to the articles;

a door pivotably connected to the body, the door comprising a plurality of apertures each aperture receiving a button therethrough, wherein when the door is in a closed position the door covers the opening in the body;

a lock comprising a latch, wherein the latch must be disengaged to move the door to an open position thereby gaining access to the article(s) and wherein the latch is disengaged by pressing one or more of the buttons a predetermined number of times;

the lock comprising a mechanical pushbutton locking mechanism arranged to disengage the latch and which does not require an electrical power source to maintain functionality of the mechanical pushbutton locking mechanism;

at least one light source;

at least one power source in communication with the at least one light source, the at least one power source disposed internally to the lockable enclosure;

at least one sensor operable to detect when the door is in an open or closed position; and at least one light pipe in communication with the at least one light source, wherein the at least one light pipe is arranged to transmit light from the at least one light source to each of the buttons, and the light pipe including outlets inserted into the plurality of apertures transmitting light to the buttons.

17. A lockable enclosure comprising:

a body having an internal cavity sized to contain one or more articles;

an opening through the body to permit access to the articles;

a door pivotably connected to the body, the door comprising a plurality of apertures each aperture receiving a button therethrough, wherein when the door is in a closed position the door covers the opening in the body;

a lock comprising a latch, wherein the latch must be disengaged to move the door to an open position thereby gaining access to the article(s) and wherein the latch is disengaged by pressing one or more of the buttons a predetermined number of times;

at least one light source;

the lock comprising a mechanical pushbutton locking mechanism arranged to disengage the latch and which does not require an electrical power source to maintain functionality of the mechanical pushbutton locking mechanism;

at least one power source in communication with the at least one light source, the at least one power source disposed internally to the lockable enclosure; at least one light pipe in communication with the at least one light source, wherein the at least one light pipe is arranged to transmit light from the at least one light source to each of the buttons, and the light pipe including outlets inserted into the plurality of apertures transmitting light to the buttons; and an additional light source located within the internal cavity of the lockable enclosure, wherein the additional light source is configured to, at least partially, illuminate the internal cavity of the lockable enclosure when the door is in an open position.

* * * * *